US012036827B2

(12) United States Patent
Tanno et al.

(10) Patent No.: US 12,036,827 B2
(45) Date of Patent: Jul. 16, 2024

(54) ABNORMALITY MONITORING SYSTEM

(71) Applicant: The Yokohama Rubber Co., LTD., Tokyo (JP)

(72) Inventors: Atsushi Tanno, Kanagawa (JP); Takue Tsuji, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 355 days.

(21) Appl. No.: 17/309,964

(22) PCT Filed: Dec. 19, 2019

(86) PCT No.: PCT/JP2019/049761
§ 371 (c)(1),
(2) Date: Jul. 6, 2021

(87) PCT Pub. No.: WO2020/145070
PCT Pub. Date: Jul. 16, 2020

(65) Prior Publication Data
US 2022/0063356 A1   Mar. 3, 2022

(30) Foreign Application Priority Data

Jan. 9, 2019 (JP) .................................. 2019-001766

(51) Int. Cl.
*B60C 23/04* (2006.01)
*B60C 19/00* (2006.01)
*B60C 23/20* (2006.01)

(52) U.S. Cl.
CPC .......... *B60C 23/0481* (2013.01); *B60C 19/00* (2013.01); *B60C 23/0488* (2013.01); *B60C 23/20* (2013.01); *B60C 2019/004* (2013.01)

(58) Field of Classification Search
CPC . B60C 23/0481; B60C 19/00; B60C 23/0488; B60C 23/20; B60C 2019/004; B60C 23/0486
See application file for complete search history.

(56) References Cited

U.S. PATENT DOCUMENTS

| 7,318,464 | B2 * | 1/2008 | Hahn | .................. | H01Q 1/2241 |
| | | | | | 152/565 |
| 11,656,070 | B2 * | 5/2023 | Stowell | ................. | B60C 1/0016 |
| | | | | | 324/635 |

(Continued)

FOREIGN PATENT DOCUMENTS

| DE | 100 40 647 A1 | 2/2002 |
| DE | 699 26 408 T2 | 5/2006 |

(Continued)

OTHER PUBLICATIONS

Translation of JP2018120455, Hisashi et al 2018, Monitoring System and Center Device (Year: 2018).*

*Primary Examiner* — John A Tweel, Jr.
(74) *Attorney, Agent, or Firm* — Thorpe North & Western

(57) ABSTRACT

An abnormality monitoring system includes gas sensors provided in the cavity or the vicinity of a tire provided in a vehicle, a determination unit that determines the presence of an abnormality in the tire on the basis of the detection results of the gas sensors, and an output unit that outputs data based on the determination result of the determination unit. The gas sensors detect a volatile substance when abnormal heat build-up occurs in the tire. The volatile substance is a substance derived from an additive added when a tire is manufactured.

19 Claims, 26 Drawing Sheets

(56) References Cited

U.S. PATENT DOCUMENTS

| | | | |
|---|---|---|---|
| 2003/0214394 A1 | 11/2003 | Behrendsen | |
| 2004/0004549 A1 | 1/2004 | Wilson | |
| 2008/0018445 A1 | 1/2008 | Shimura | |
| 2008/0035259 A1* | 2/2008 | Mancosu | B29D 30/0662 |
| | | | 156/60 |
| 2009/0107228 A1 | 4/2009 | Ridley et al. | |
| 2009/0151829 A1* | 6/2009 | Lionetti | B60C 23/0493 |
| | | | 152/152.1 |

FOREIGN PATENT DOCUMENTS

| | | |
|---|---|---|
| JP | 2003-211926 A | 7/2003 |
| JP | 2005-530181 A | 10/2005 |
| JP | 2007-182212 A | 7/2007 |
| JP | 2008-256387 A | 10/2008 |
| JP | 2018-120455 A | 8/2018 |
| JP | 2020-023250 A | 2/2020 |
| WO | WO 01/17806 A1 | 3/2001 |

* cited by examiner

ABNORMALITY MONITORING SYSTEM

TECHNICAL FIELD

The present technology relates to an abnormality monitoring system.

BACKGROUND ART

In a traveling vehicle, when an abnormality occurs in a tire, there is a risk that driving will be hindered. Thus, it is preferable to detect the tire abnormalities at an early stage. A technique using a sensor for detecting airborne molecules generated when the material of a pneumatic tire is overheated and the temperature thereof reaches a damage temperature level that causes decomposition of the tire material is known (for example, Japan Unexamined Patent Publication No. 2005-530181). In this technique, the sensor detects the temperature of the entire tire or the temperature of the air contained in the tire cavity portion before it reaches the damage temperature level.

In addition, a technique in which a vehicle is provided with a sensor for detecting a substance generated as a sign of a failure of an automobile and a concentration of the substance is known (for example, Japan Unexamined Patent Publication No. 2008-256387). In this technique, the detection result of the concentration of a substance generated as a sign of a failure is compared with a threshold value, and a warning is generated when the detection result of the sensor is equal to or greater than the threshold value.

However, in the techniques disclosed in Japan Unexamined Patent Publication Nos. 2005-530181 and 2008-256387, there is room for improvement in avoiding erroneous detection and identifying a tire where abnormalities may have occurred among a plurality of tires provided on a vehicle.

SUMMARY

The present technology provides an abnormality monitoring system that can avoid erroneous detection and can easily identify a tire where abnormalities may have occurred among a plurality of tires provided on a vehicle.

An abnormality monitoring system according to an aspect of the present technology includes: a gas sensor provided in a cavity of a tire provided in a vehicle or in the vicinity of the tire; a determination unit that determines the presence of an abnormality in the tire on the basis of the detection result of the gas sensor; and an output unit that outputs data based on the determination result of the determination unit, the gas sensor detecting a volatile substance when abnormal heat build-up occurs in the tire, and the volatile substance being a substance derived from an additive added when the tire is manufactured.

In the abnormality monitoring system, a plurality of the gas sensors may be included, and the determination unit may make a determination on the basis of the detection results of the plurality of the gas sensors.

In the abnormality monitoring system, the vehicle may include a plurality of the tires, the plurality of the gas sensors may be provided corresponding to the plurality of the tires, and the determination unit may determine the presence of an abnormality in the tire by comparing the detection results of the plurality of the gas sensors.

In the abnormality monitoring system, the plurality of the gas sensors may be provided at different positions of the vehicle, and the determination unit may determine the presence of an abnormality in the tire by comparing the detection results of the plurality of the gas sensors.

In the abnormality monitoring system, the plurality of the gas sensors may include a gas sensor provided at a position near the tire and a gas sensor provided at a position away from the vicinity of the tire, and the determination unit may determine the presence of an abnormality in the tire by comparing the detection results of the plurality of the gas sensors.

The tire of the vehicle may volatilize a gas of a thiazole-based compound as the temperature increases, and the gas sensor may detect at least a concentration of the gas of the thiazole-based compound.

The tire of the vehicle may volatilize a gas having a type other than the thiazole-based compound as the temperature increases, and the abnormality monitoring system may further include a gas sensor that detects a concentration of the gas having the type other than the thiazole-based compound.

The gas sensor may include a gas sensor that corresponds to a plurality of types of gases and detects a concentration of each gas, and the tire of the vehicle may contain a plurality of types of substances which volatilize as the temperature increases and of which the boiling points are mutually different by a predetermined temperature or higher.

The abnormality monitoring system may further include a temperature sensor that detects a temperature of an outer surface of the tire or the cavity of the tire, and the determination unit may determine the presence of an abnormality in the tire on the basis of a detection result of the gas sensor and a detection result of the temperature sensor.

The determination unit may determine that there is a possibility of abnormal heat build-up in the tire of the host vehicle when, after gas is detected by the gas sensor, the same gas is detected by the gas sensor after a predetermined time has elapsed.

The determination unit may determine the presence of an abnormality in the tire by comparing a detection result of the gas sensor with a predetermined threshold value.

The abnormality monitoring system may further include a speed sensor that detects a travel speed of the vehicle, the determination unit may have a plurality of types of predetermined threshold values that is selectable, and the determination unit may make the determination using a threshold value selected on the basis of a detection result of the speed sensor among the plurality of types of predetermined threshold values.

The abnormality monitoring system may further include at least one of an air pressure sensor that detects an air pressure of the cavity of the tire and a temperature sensor that detects a temperature of the outer surface of the tire or the cavity of the tire, and the determination unit may determine the presence of an abnormality in the tire on the basis of a detection result of at least one of the air pressure sensor and the temperature sensor and a detection result of the gas sensor.

The abnormality monitoring system may further include another temperature sensor that detects a temperature of a braking device provided in the vicinity of a wheel of the vehicle, the gas sensor may be provided in the vicinity of the other temperature sensor, and the presence of an abnormality in the tire may be determined on the basis of a detection result of the other temperature sensor and a detection result of the gas sensor.

According to embodiments of the present technology, erroneous detection can be avoided and a tire where abnormalities may have occurred among a plurality of tires provided on a vehicle can be easily identified.

DETAILED DESCRIPTION

Embodiments of the present technology are described in detail below with reference to the drawings. In the embodiments described below, identical or substantially similar components to those of other embodiments have identical reference signs, and descriptions of those components are either simplified or omitted. The present technology is not limited by the embodiments. Constituents of the embodiments include elements that are substantially identical or that can be substituted and easily conceived by one skilled in the art. Furthermore, the plurality of modified examples described in the embodiments can be combined as desired within the scope apparent to one skilled in the art.

Arrangement of Gas Sensors

Figure 1:
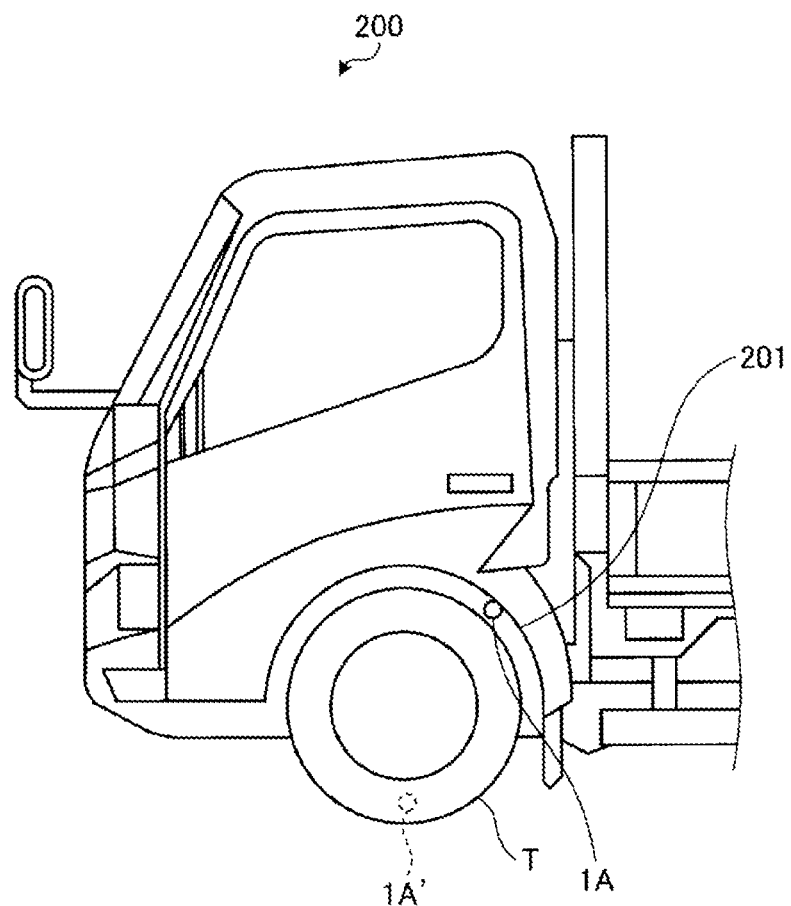
FIG. 1 is a diagram illustrating an example of arrangement of gas sensors in a vehicle.
Figure 2:
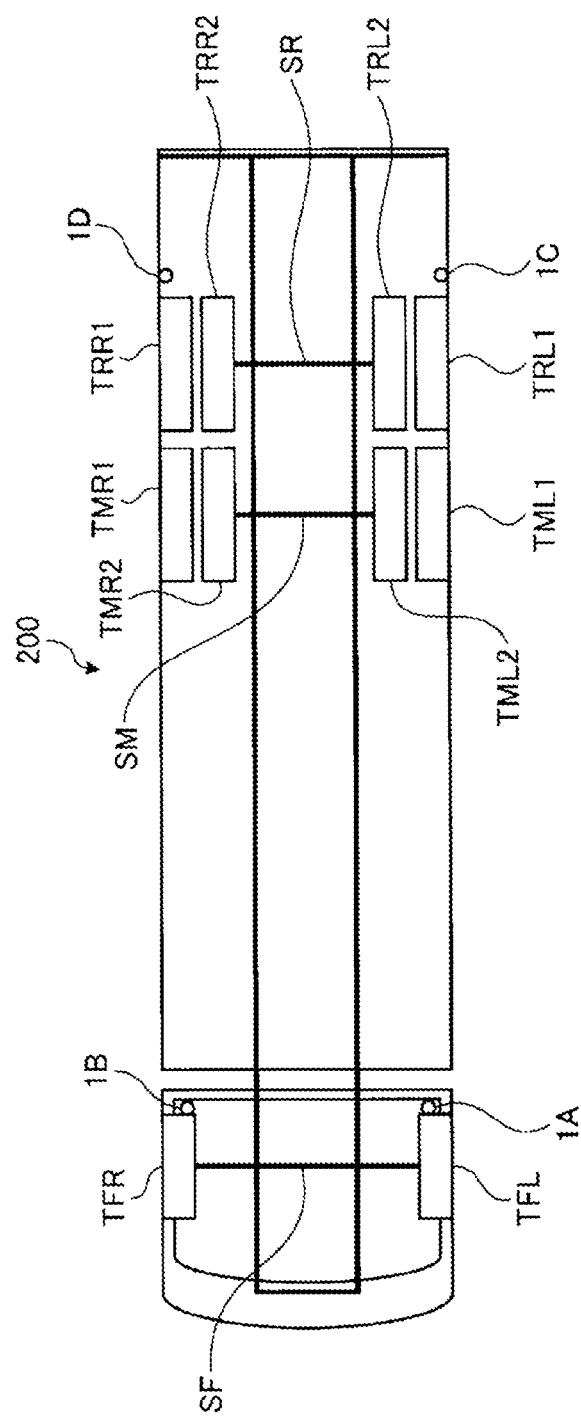
FIG. 2 is a diagram illustrating an example of arrangement of gas sensors in a vehicle.

FIGS. 1 and 2 are diagrams illustrating examples of the arrangement of gas sensors in a vehicle 200. FIGS. 1 and 2 illustrate an example of the arrangement of gas sensors when the vehicle 200 is a freight vehicle.

In FIG. 1, the vehicle 200 includes a gas sensor 1A or a gas sensor 1A'. The gas sensor 1A and the gas sensor 1A' each correspond to a wheel of a tire T. The gas sensor 1A is provided in the vicinity of the tire T, corresponding to the wheel of the tire T. The gas sensor 1A' is provided in the inner portion, in other words, the cavity of the tire T, corresponding to the wheel of the tire T. The gas sensor 1A and the gas sensor 1A' can both be considered to be provided corresponding to the tire T. Note that the vehicle 200 may include both the gas sensor 1A in the vicinity of the tire T and the gas sensor 1A' in the cavity of the tire T.

Here, the vicinity of the tire T is, for example, the inner surface, in other words, a position facing the tire of the tire housing 201. In order to detect a substance that volatilizes from the tire T, the gas sensor 1A is preferably provided at a position facing the tire T.

A gas sensor 1A' provided in the cavity of the tire T may include a battery for supplying electric power required for its own operation. Additionally, electric power may be supplied to the gas sensor 1A' from a battery outside the tire T. Electric power may be generated in the cavity of the tire T and the obtained electric power may be supplied to the gas sensors 1A'.

The gas sensors 1A and 1A' detect a volatile substance when abnormal heat build-up occurs in the tire T. A volatile substance is a substance derived from the additives added when the tire T is manufactured.

In FIG. 2, the vehicle 200 includes two tires on the front wheels and eight tires on the rear wheels. The tires TFL and TFR of the front wheels of the vehicle 200 are attached to different wheels of the same axle SF.

In FIG. 2, the four tires TMR1, TMR2, TML1, and TML2 on the front side of the rear wheels of the vehicle 200 are attached to the same axle SM. The tires TMR1 and TMR2 are attached to the same wheel as a double tire. The tires TML1 and TML2 are attached to the same wheel as a double tire.

In FIG. 2, the four tires TRR1, TRR2, TRL1, and TRL2 on the rear side of the rear wheels of the vehicle 200 are attached to the same axle SR. The tires TRR1 and TRR2 are attached to the same wheel as a double tire. The tires TRL1 and TRL2 are attached to the same wheel as a double tire.

In this example, the plurality of gas sensors 1A, 1B, 1C, and 1D are disposed on the vehicle 200. The plurality of gas sensors 1A, 1B, 1C, and 1D are provided corresponding to different wheels. The gas sensor 1A is provided in the vicinity of the tire TFL on the front wheel of the vehicle 200 (for example, in the tire housing). The gas sensor 1B is provided in the vicinity of the tire TFR of the front wheel of the vehicle 200 (for example, in the tire housing). The gas sensor 1C is provided in the vicinity of the tire TRL1 on the rear side of the rear wheel of the vehicle 200 (for example, in the tire housing). The gas sensor 1D is provided in the vicinity of the tire TRR1 on the rear side of the rear wheel of the vehicle 200 (for example, in the tire housing). Thus, the plurality of gas sensors 1A, 1B, 1C, and 1D are provided at different positions of the vehicle 200.

Function of Abnormality Monitoring System

Figure 3:
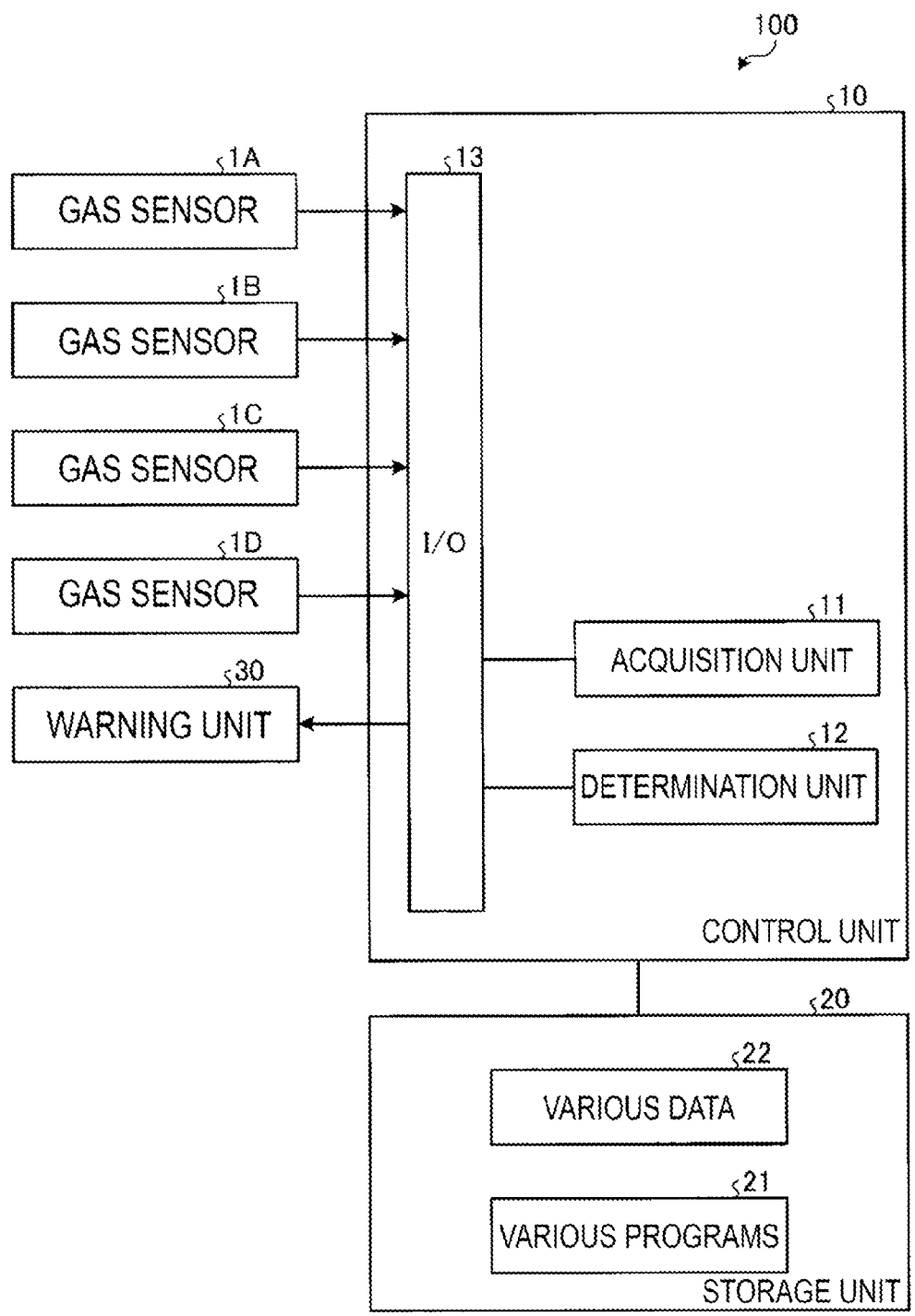
FIG. 3 is a block diagram illustrating the functions of an abnormality monitoring system.

FIG. 3 is a block diagram illustrating the functions of the abnormality monitoring system 100. In FIG. 3, the abnormality monitoring system 100 includes a control unit 10, a storage unit 20, and a warning unit 30. The control unit 10 is a device that comprehensively controls the operation of the abnormality monitoring system 100, and includes, for example, a central processing unit (CPU), a read-only memory (ROM), a random-access memory (RAM) and the like. The control unit 10 includes an acquisition unit 11, a determination unit 12, and an input/output unit (I/O) 13. Specifically, the CPU of the control unit 10 reads and executes various programs to realize these functions.

The acquisition unit 11 acquires data of various sensors such as a gas sensor. The data acquired by the acquisition unit 11 is stored in the storage unit 20. The input/output unit (I/O) 13 functions as an input unit for inputting data of various sensors such as a gas sensor. The input/output unit (I/O) 13 functions as an output unit for outputting data based on the determination result of the determination unit 12.

The storage unit 20 is a device for storing various programs 21 and various data 22 used for processing by the control unit 10. The storage unit 20 is configured, for example, by a non-volatile memory or a magnetic storage unit.

The warning unit 30 is a device for outputting a warning to the driver of the vehicle 200. The warning unit 30 outputs a warning on the basis of a warning signal output from the control unit 10. The control unit 10 outputs the warning signal when it is determined that there is a possibility of abnormal heat build-up in the tire of the host vehicle. The warning unit 30 outputs a warning to the driver of the vehicle 200. The warning is performed by, for example, audio output or display output. The warning unit 30 may output a warning to the driver of the vehicle 200 and output a warning to an external device.

Main Operation of Abnormality Monitoring System

Figure 4:
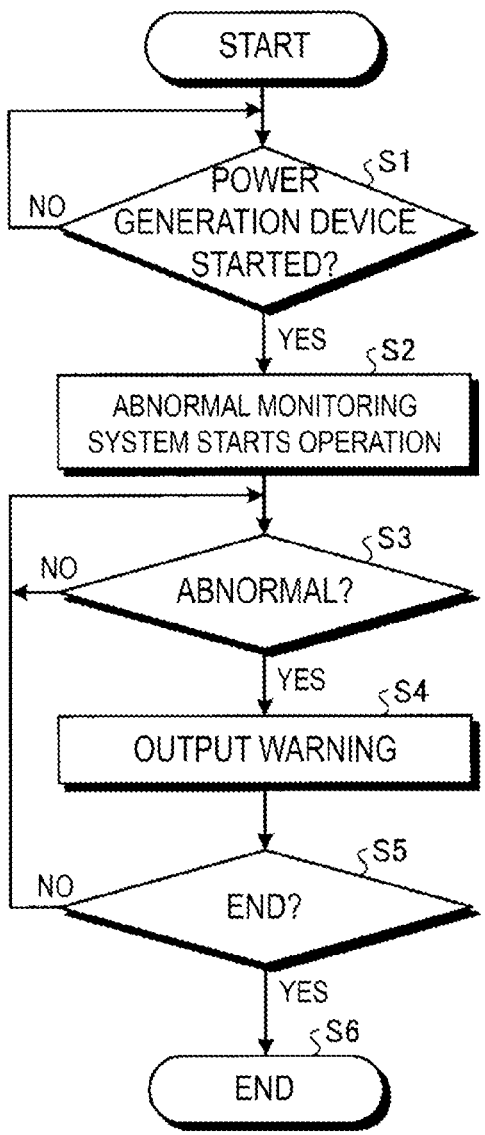
FIG. 4 is a flowchart illustrating an example of a main operation of an abnormality monitoring system.

FIG. 4 is a flowchart illustrating an example of a main operation or the like of the abnormality monitoring system 100. In FIG. 4, first, it is determined whether a power generation device (not illustrated) of the vehicle 200 has started (step S1). The power generation device of the vehicle 200 is, for example, an engine or an electric motor. For example, when it is detected that the ignition switch of the vehicle 200 is turned on, it may be determined that the power generation device has started.

In step S1, when it is determined that the power generation device of the vehicle 200 has started (Yes in step S1), the abnormality monitoring system 100 starts an operation (step S2).

In the abnormality monitoring system 100, the determination unit 12 determines whether there is an abnormality in each tire of the vehicle 200 (step S3). In step S3, when it is determined that there is an abnormality (Yes in step S3), the warning unit 30 outputs a warning (step S4). After that, the abnormality monitoring system 100 determines whether the operation is to be ended (step S5). When the operation is to be ended, the operation of the abnormality monitoring system 100 ends (Yes in step S5, step S6).

Note that in step S1, when it is determined that the power generation device of the vehicle 200 has not started (No in step S1), the process returns to step S1. When it is determined in step S3 that there is no abnormality (No in step S3) and when the operation has not been ended in step S5 (No in step S5), the process returns to step S3, and the abnormality monitoring system 100 continues the operation.

Figure 5:
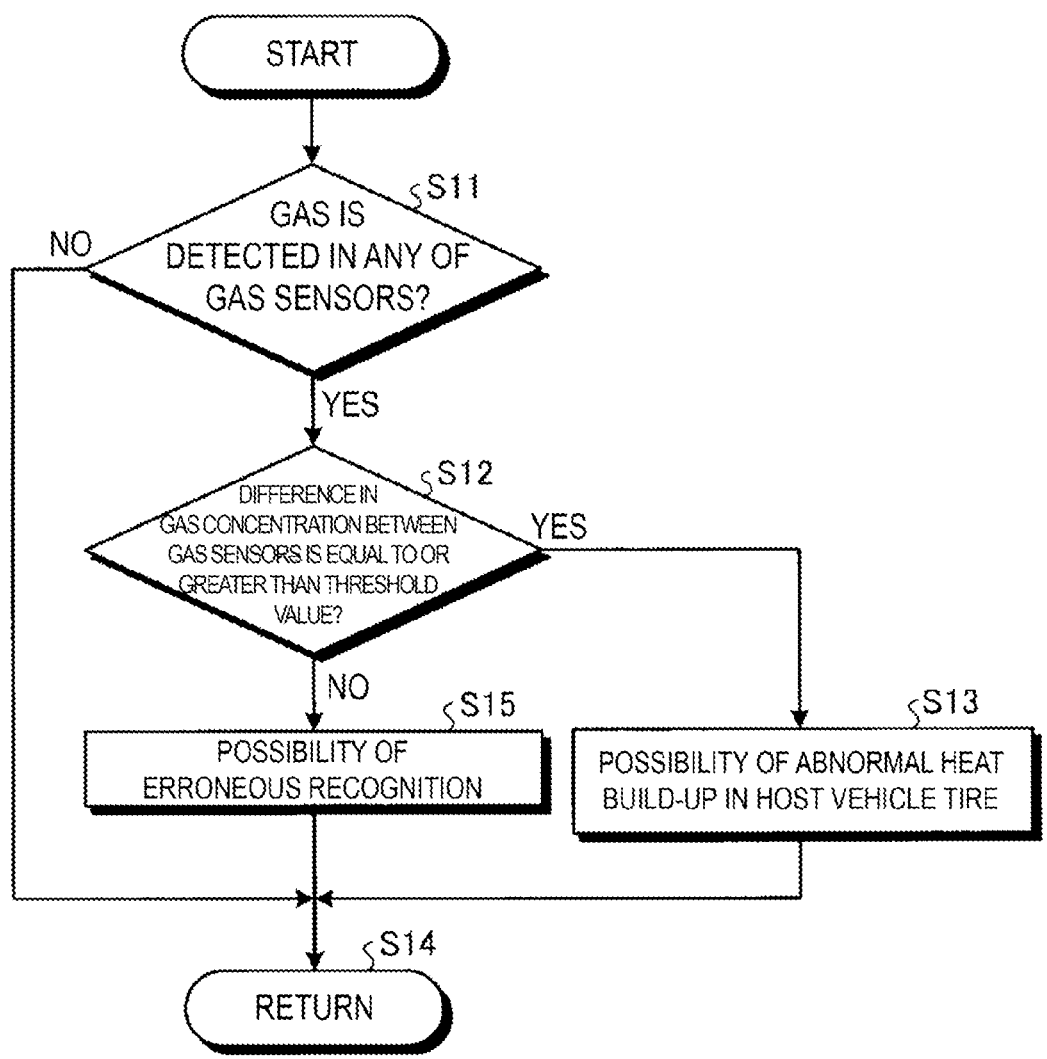
FIG. 5 is a flowchart illustrating an example of a determination operation of an abnormality monitoring system that determines in consideration of a position element of a gas sensor disposed in a vehicle.

Abnormality Monitoring System that Determines in Consideration of Position Element FIG. 5 is a flowchart illustrating an example of the determination operation of the abnormality monitoring system 100 that determines in consideration of the position elements of the gas sensors disposed in the vehicle 200. In this example, the determining operation in FIG. 5 is performed as a subroutine for the main operation illustrated in FIG. 4.

In FIG. 5, the abnormality monitoring system 100 determines whether gas has been detected by any of the gas sensors (step S11). As a result of the determination in step S11, the gas is detected by any of the gas sensors (Yes in step S11), the abnormality monitoring system 100 compares the gas concentration detected by the gas sensor and a gas concentration detected by another gas sensor, and determines whether the difference is equal to or greater than a predetermined threshold value (step S12). In other words, it is determined whether the difference between the gas concentrations detected by the plurality of gas sensors is equal to or greater than a predetermined threshold value.

As a result of the determination in step S12, when the difference in the gas concentration between the plurality of gas sensors is equal to or greater than a predetermined threshold value (Yes in step S12), the abnormality monitoring system 100 determines that there is a possibility of abnormal heat build-up in the tire of the host vehicle (step S13). After that, the abnormality monitoring system 100 returns to the main operation illustrated in FIG. 4 (step S14).

As a result of the determination in step S12, when the difference in the gas concentration between the gas sensors is not equal to or greater than a predetermined threshold value (No in step S12), the abnormality monitoring system 100 determines that there is a possibility of erroneous recognition due to environmental factors around the vehicle (step S15). After that, the abnormality monitoring system 100 returns to the main operation illustrated in FIG. 4 (step S14).

As a result of the determination in step S11, when no gas has been detected by any of the gas sensors (No in step S11), the abnormality monitoring system 100 returns to the main operation illustrated in FIG. 4 (step S14).

According to the above-described operation, the gas concentrations detected by the plurality of gas sensors are compared, and it is determined that there is a possibility of abnormal heat build-up in the tire of the host vehicle only when the difference is equal to or greater than a predetermined threshold value. Thus, the possibility of erroneous recognition due to environmental factors around the vehicle can be eliminated, and the possibility of abnormal heat build-up in the tire of the host vehicle can be more accurately determined. By detecting an excessive increase in the temperature of the tire in advance, abnormal heat build-up in the tire and bursting of the tire can be prevented and prevent heating of the tire due to the heat of the vehicle and occurrence of failures or fire can be prevented.

Additionally, when the tire generates abnormal heat, since it is rare that the abnormal heat build-up occurs in all of the plurality of tires at the same time, erroneous detection can be suppressed by comparing the detection results of the plurality of tires.

Figure 6:
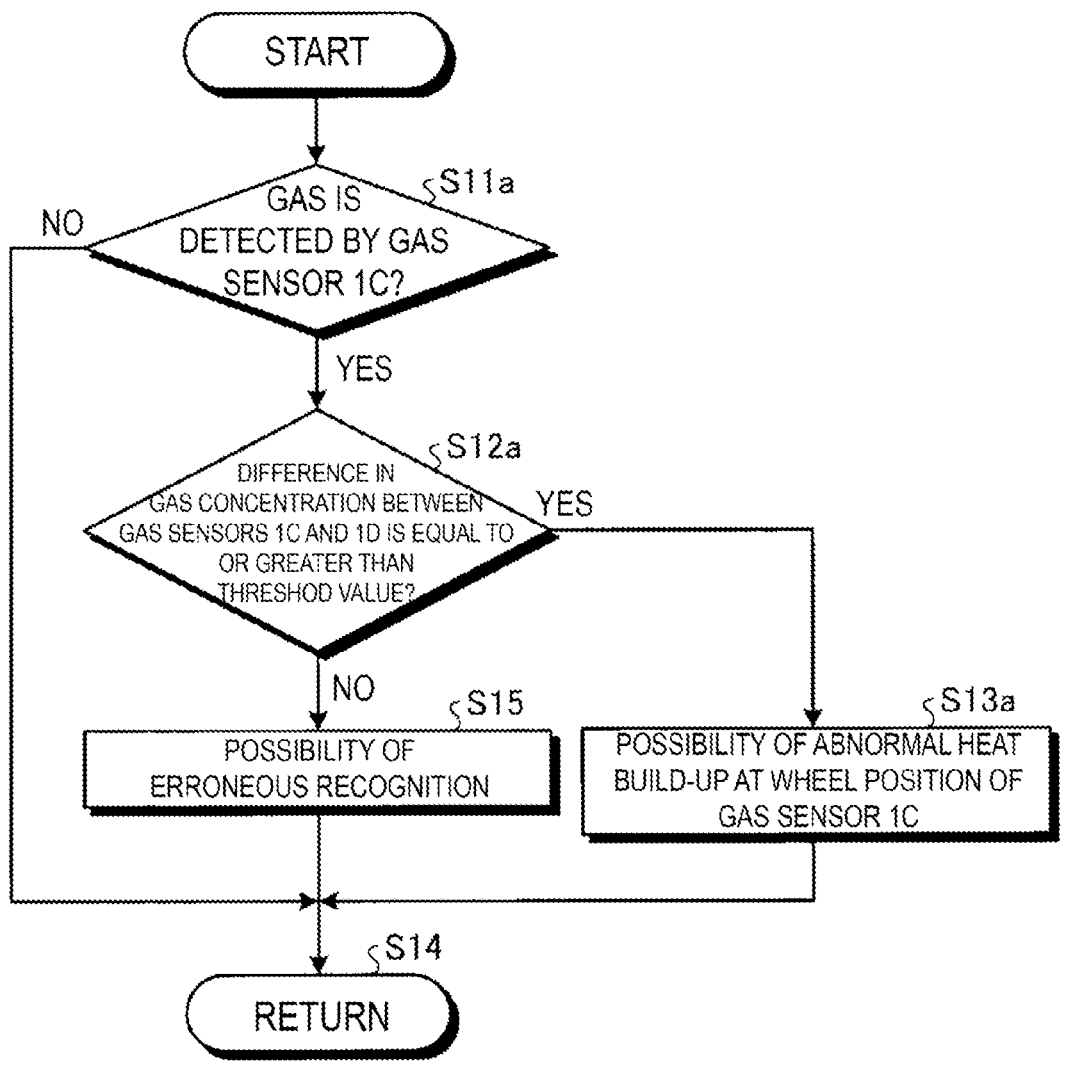
FIG. 6 is a flowchart illustrating a more specific example of the determination operation in FIG. 5.
Figure 7:
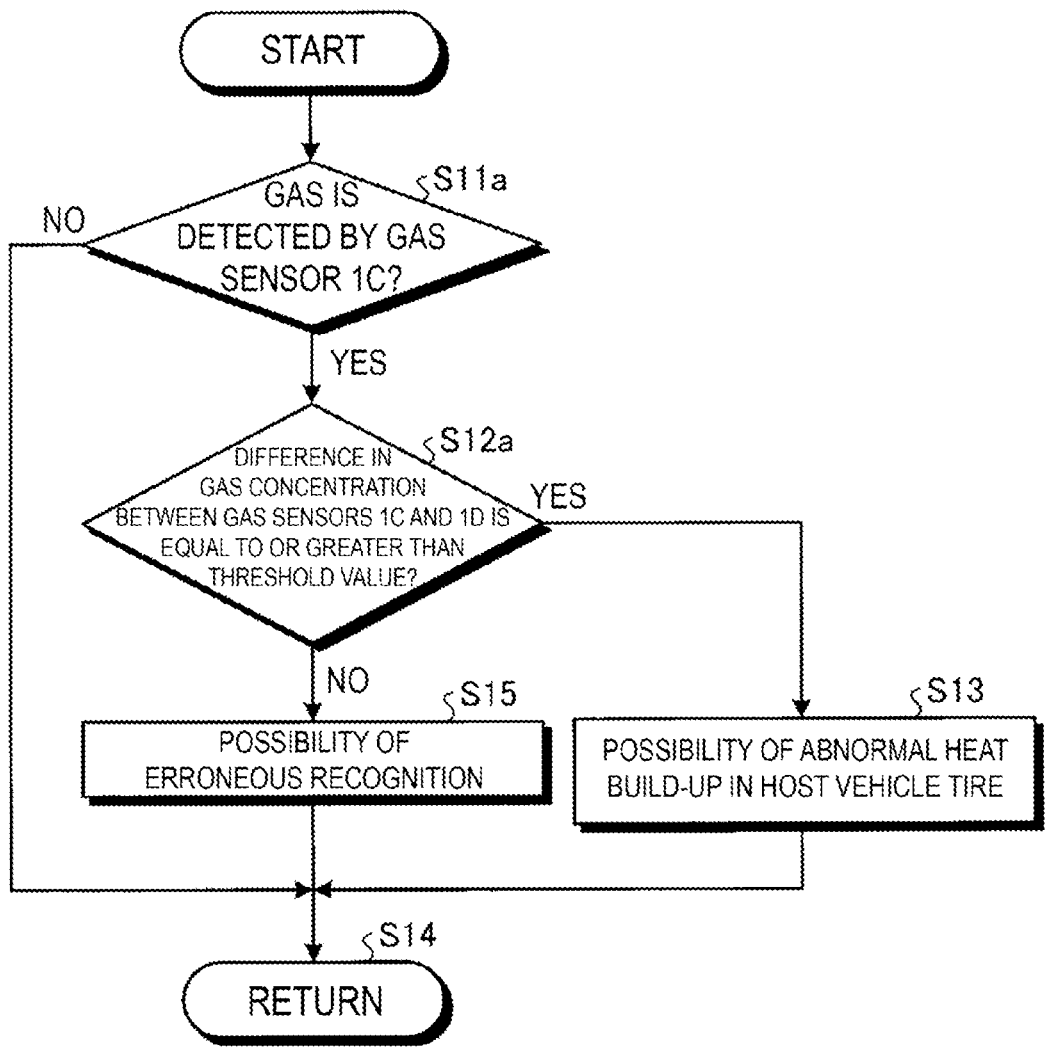
FIG. 7 is a flowchart illustrating a more specific example of the determination operation in FIG. 5.

FIGS. 6 and 7 are flowcharts illustrating more specific examples of the determination operation in FIG. 5. FIGS. 6 and 7 illustrate the determination operation using the gas sensors 1C and 1D in FIG. 2. The gas sensor 1C is provided corresponding to the tires TRL1 and TRL2 that are attached to the same wheel of the axle SR as a double tire. The gas sensor 1C is intended to detect the tires TRL1 and TRL2. The gas sensor 1D is provided corresponding to the tires TRR1 and TRR2 that are attached to the same wheel of the axle SR as a double tire. The gas sensor 1D is intended to detect the tires TRR1 and TRR2.

In FIG. 6, the abnormality monitoring system 100 determines whether gas has been detected by the gas sensor 1C (step S11a). As a result of the determination in step S11a, when gas has been detected by the gas sensor 1C (Yes in step S11a), the abnormality monitoring system 100 compares the gas concentration detected by the gas sensor 1C with the gas concentration detected by another gas sensor 1D, and determines whether the difference is equal to or greater than a predetermined threshold value (step S12a).

As a result of the determination in step S12a, when the difference in the gas concentration is equal to or greater than the predetermined threshold value (Yes in step S12a), the abnormality monitoring system 100 determines that there is a possibility of abnormal heat build-up in the tire at the wheel position to be detected by the gas sensor 1C (step S13a). After that, the abnormality monitoring system 100 returns to the main operation illustrated in FIG. 4 (step S14).

As a result of the determination in step S12a, when the difference in the gas concentration is not equal to or greater than a predetermined threshold value (No in step S12a), the abnormality monitoring system 100 determines that there is a possibility of erroneous recognition due to environmental factors around the vehicle (step S15). After that, the abnormality monitoring system 100 returns to the main operation illustrated in FIG. 4 (step S14).

As a result of the determination in step S11a, when the gas has not been detected by the gas sensor 1C (No in step S11a), the abnormality monitoring system 100 returns to the main operation illustrated in FIG. 4 (step S14).

Additionally, in FIG. 7, the abnormality monitoring system 100 determines whether gas has been detected by the gas sensor 1C (step S11a). As a result of the determination in step S11a, when the gas has been detected by the gas sensor 1C (Yes in step S11a), the abnormality monitoring system 100 compares the gas concentration detected by the gas sensor 1C with the gas concentration detected by the other gas sensor 1D, and determines whether the difference is equal to or greater than a predetermined threshold value (step S12a).

As a result of the determination in step S12a, when the difference in the gas concentration is equal to or greater than the predetermined threshold value (Yes in step S12a), the abnormality monitoring system 100 determines that there is a possibility of abnormal heat build-up in the tire of the host vehicle (step S13). After that, the abnormality monitoring system 100 returns to the main operation illustrated in FIG. 4 (step S14).

As a result of the determination in step S12a, when the difference in the gas concentration is not equal to or greater than a predetermined threshold value (No in step S12a), the abnormality monitoring system 100 determines that there is a possibility of erroneous recognition due to environmental factors around the vehicle (step S15). After that, the abnormality monitoring system 100 returns to the main operation illustrated in FIG. 4 (step S14).

As a result of the determination in step S11a, when the gas has not been detected by the gas sensor 1C (No in step S11a), the abnormality monitoring system 100 returns to the main operation illustrated in FIG. 4 (step S14).

Figure 8:
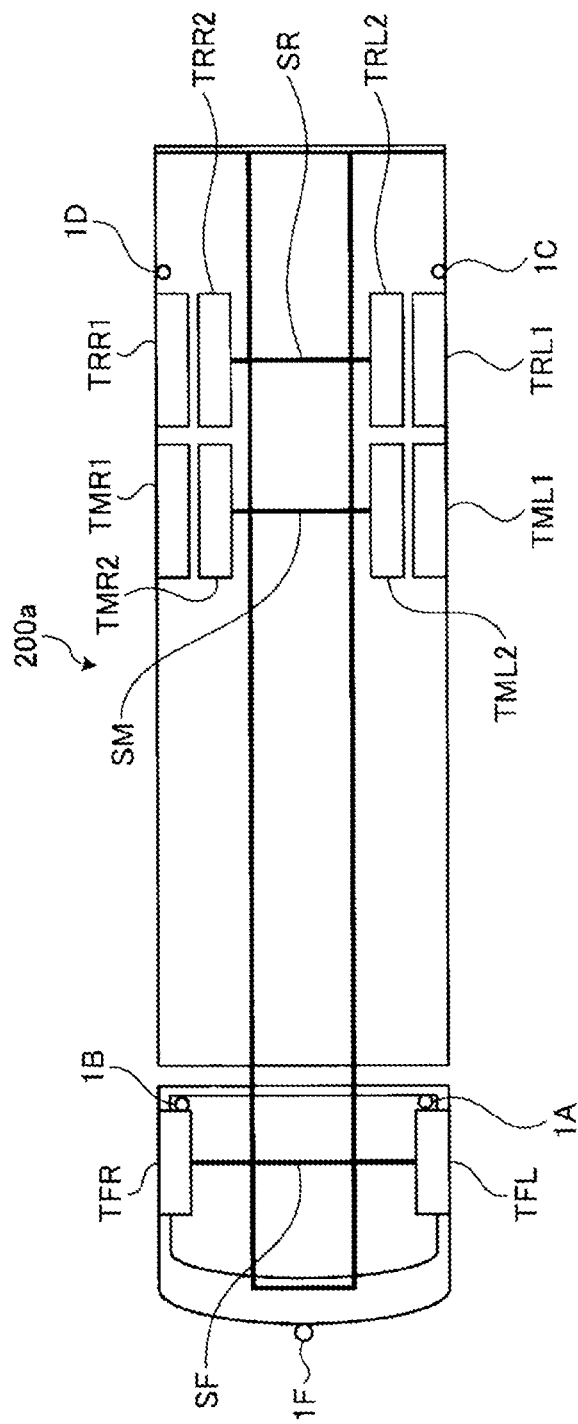
FIG. 8 is a diagram illustrating another example of the arrangement of gas sensors when the vehicle is a freight vehicle.

FIG. 8 is a diagram illustrating another example of the arrangement of the gas sensors when the vehicle is a freight vehicle. Unlike the vehicle 200 illustrated in FIG. 2, a vehicle 200a in FIG. 8 is provided with a gas sensor 1F on the front surface of the vehicle. The gas sensor 1F is provided at a position away from the vicinity of the tire. "Position away from the vicinity of the tire" refers to the position of the front portion of the vehicle in which the traveling air is obtained without being affected by the gas volatilizing from the tire, or a position where outside air can easily hit, such as the outer contours of the vehicle body, such as the upper portion of the vehicle body, the side portion of the vehicle body (other than the vicinity of the tire), and the rear portion of the vehicle body. The gas sensor 1F is intended to measure outside air and can detect a gas contained in the outside air. Thus, the plurality of gas sensors 1A, 1B, 1C, and 1D, and the gas sensor 1F are provided at different positions of the vehicle 200. The gas sensor 1F may be provided inside an air conditioner or a ventilation device mounted on the vehicle 200. In this case, the air taken into a ventilation path from an outside air introduction port of the air conditioner or the ventilation device is regarded as the outside air, and is the measurement target of the gas sensor 1F. In other words, a gas sensor installed in a pathway of a ventilation path for introducing outside air in the air conditioner or the ventilation device mounted on the vehicle 200 may be used. Note that when an air purifying device is provided in a vehicle, the gas sensor of the air purifying device may be used as the gas sensor 1F.

Figure 9:
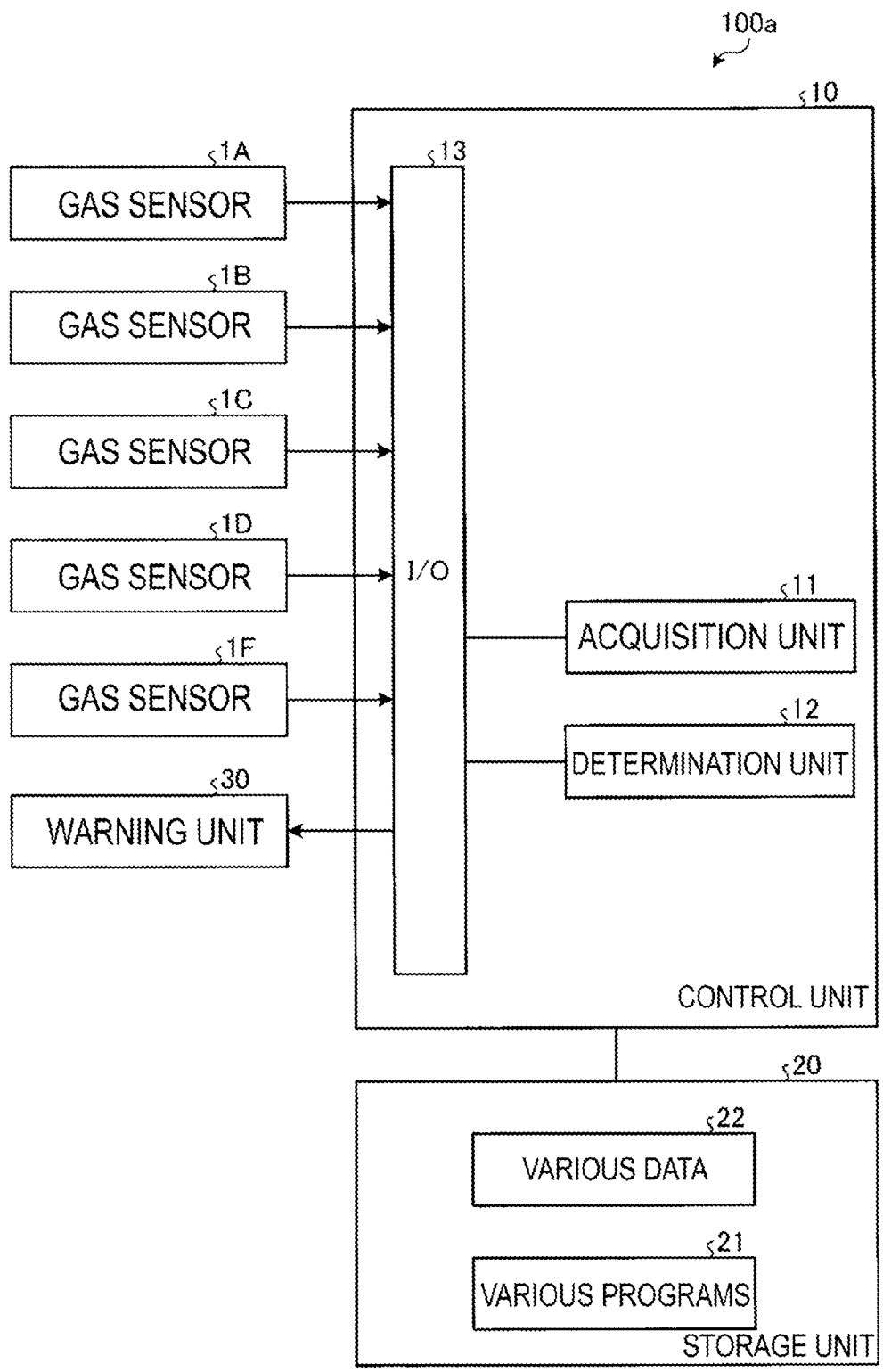
FIG. 9 is a diagram illustrating another example of an abnormality monitoring system that determines in consideration of a position element.

FIG. 9 is a diagram illustrating an example of another abnormality monitoring system 100a that determines in consideration of the position elements. In FIG. 9, a difference between the abnormality monitoring system 100a and the abnormality monitoring system 100 described with reference to FIG. 3 is that the control unit 10 acquires the detection result of the gas sensor 1F provided on the front surface of the vehicle 200a. The gas sensor 1F provided on the front surface of the vehicle 200a hardly detects the volatile gas of each tire of the vehicle 200a. Thus, the gas sensor 1F provided on the front surface of the vehicle 200a can detect gas due to environmental factors around the vehicle 200a. By using the detection result of the gas by the gas sensor 1F, the possibility of abnormal heat build-up in the tire can be determined in consideration of environmental factors around the vehicle 200a.

Figure 10:
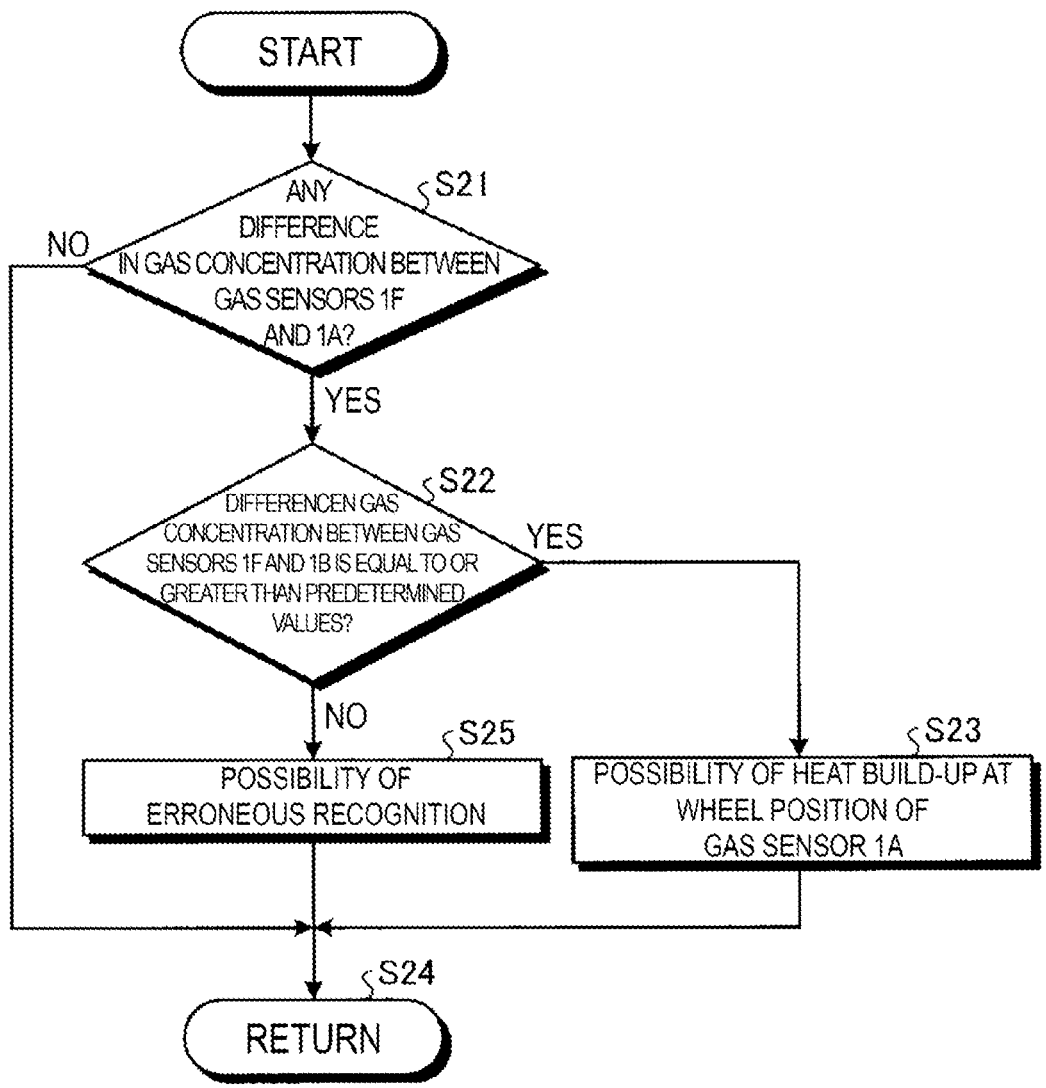
FIG. 10 is a flowchart illustrating an example of a determination operation using a gas detection result by a gas sensor provided on a front surface of a vehicle.

FIG. 10 is a flowchart illustrating an example of a determination operation using the detection result of gas by the gas sensor 1F provided on the front surface of the vehicle 200a. In FIG. 10, the abnormality monitoring system 100a compares the gas concentration detected by the gas sensor 1F with the gas concentration detected by the gas sensor 1A, and determines whether there is a difference in the gas concentrations (step S21). As a result of the determination in step S21, when there is a difference in the detected gas concentration (Yes in step S21), the abnormality monitoring system 100a determines whether there is a difference that is equal to or greater than a predetermined value between the difference in the detected gas concentration in step S21 and a difference between the gas concentration detected by the gas sensor 1F and the gas concentration detected by the gas sensor 1B (step S22).

As a result of the determination in step S22, when the difference is equal to or greater than the predetermined value (Yes in step S22), the abnormality monitoring system 100a determines that there is a possibility of abnormal heat build-up in the tire at the wheel position of the gas sensor 1A (step S23). After that, the abnormality monitoring system 100a returns to the main operation illustrated in FIG. 4 (step S24).

As a result of the determination of step S22, when the difference is not equal to or greater than the predetermined value (No in step S22), the abnormality monitoring system 100a determines that there is a possibility of erroneous recognition due to environmental factors around the vehicle (step S25). After that, the abnormality monitoring system 100a returns to the main operation illustrated in FIG. 4 (step S24).

As a result of the determination in step S21, when there is no difference in the detected gas concentration (No in step S21), the abnormality monitoring system 100a returns to the main operation illustrated in FIG. 4 (step S24).

As described above, the presence of abnormalities in the tire can be determined by providing the gas sensor 1F for outside air for measuring outside air at a position away from at least the vicinity of the tire of the vehicle, and comparing the detection results of the volatile substance by the gas sensors 1A to 1D provided in the cavity or the vicinity of the tire with the detection result of the volatile substance by the gas sensor 1F for outside air.

Here, there is a possibility of erroneous detection, for example, when the temperatures of all tires gradually increase such as at continuous high speeds. Thus, as described above, the detection accuracy is improved by comparing with the detection result of the outside air different from the detection result in the vicinity or the cavity of the tire. Furthermore, by comparing with the detection result of the outside air, it is possible to distinguish from volatile substances derived from heat build-up of a rubber part other than the tire, for example a sliding part such as a fan belt.

Figure 11:
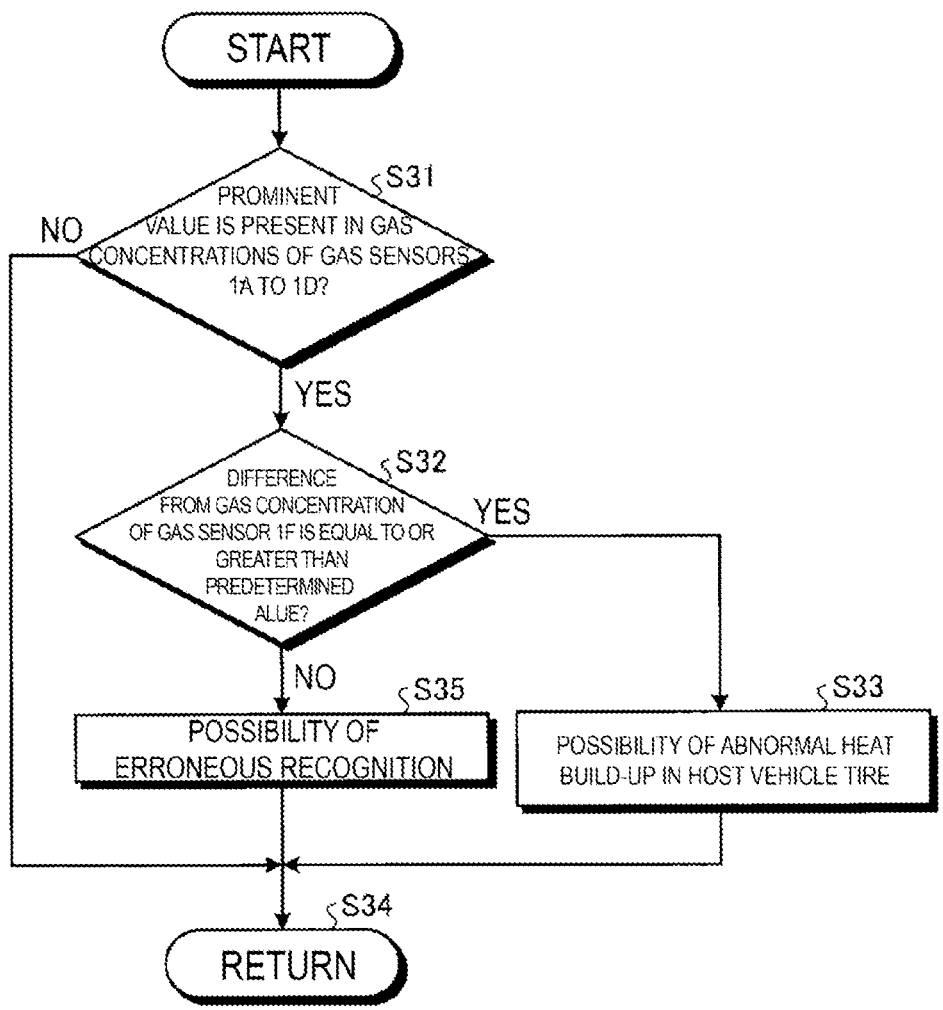
FIG. 11 is a flowchart illustrating another example of a determination operation using a gas detection result by a gas sensor provided on a front surface of a vehicle.

FIG. 11 is a flowchart illustrating another example of a determination operation using the gas detection result by the gas sensor 1F provided on the front surface of the vehicle 200a. In FIG. 11, the abnormality monitoring system 100a determines whether there is a prominent value for the gas concentrations detected by the four gas sensors 1A to 1D (step S31). The case where there is a prominent value is, for example, a case in which the gas concentration detected by a certain gas sensor is twice or more the gas concentration detected by the other gas sensors. As a result of the determination in step S31, when there is a prominent value (Yes in step S31), the abnormality monitoring system 100a compares the concentration of the gas having the prominent value with the gas concentration detected by the gas sensor 1F and determines whether the difference is equal to or greater than a predetermined value (step S32).

As a result of the determination in step S32, when the difference is equal to or greater than the predetermined value (Yes in step S32), the abnormality monitoring system 100a determines that there is a possibility of abnormal heat build-up in the tire of the host vehicle (step S33). After that, the abnormality monitoring system 100a returns to the main operation illustrated in FIG. 4 (step S34).

As a result of the determination of step S32, when the difference is not equal to or greater than the predetermined value (No in step S32), the abnormality monitoring system 100a determines that there is a possibility of erroneous recognition due to environmental factors around the vehicle (step S35). After that, the abnormality monitoring system 100a returns to the main operation illustrated in FIG. 4 (step S34).

As a result of the determination in step S31, when there is no difference in the detected gas concentration (No in step S31), the abnormality monitoring system 100a returns to the main operation illustrated in FIG. 4 (step S34).

Abnormality Monitoring System that Determines in Consideration of Time Element

Figure 12:
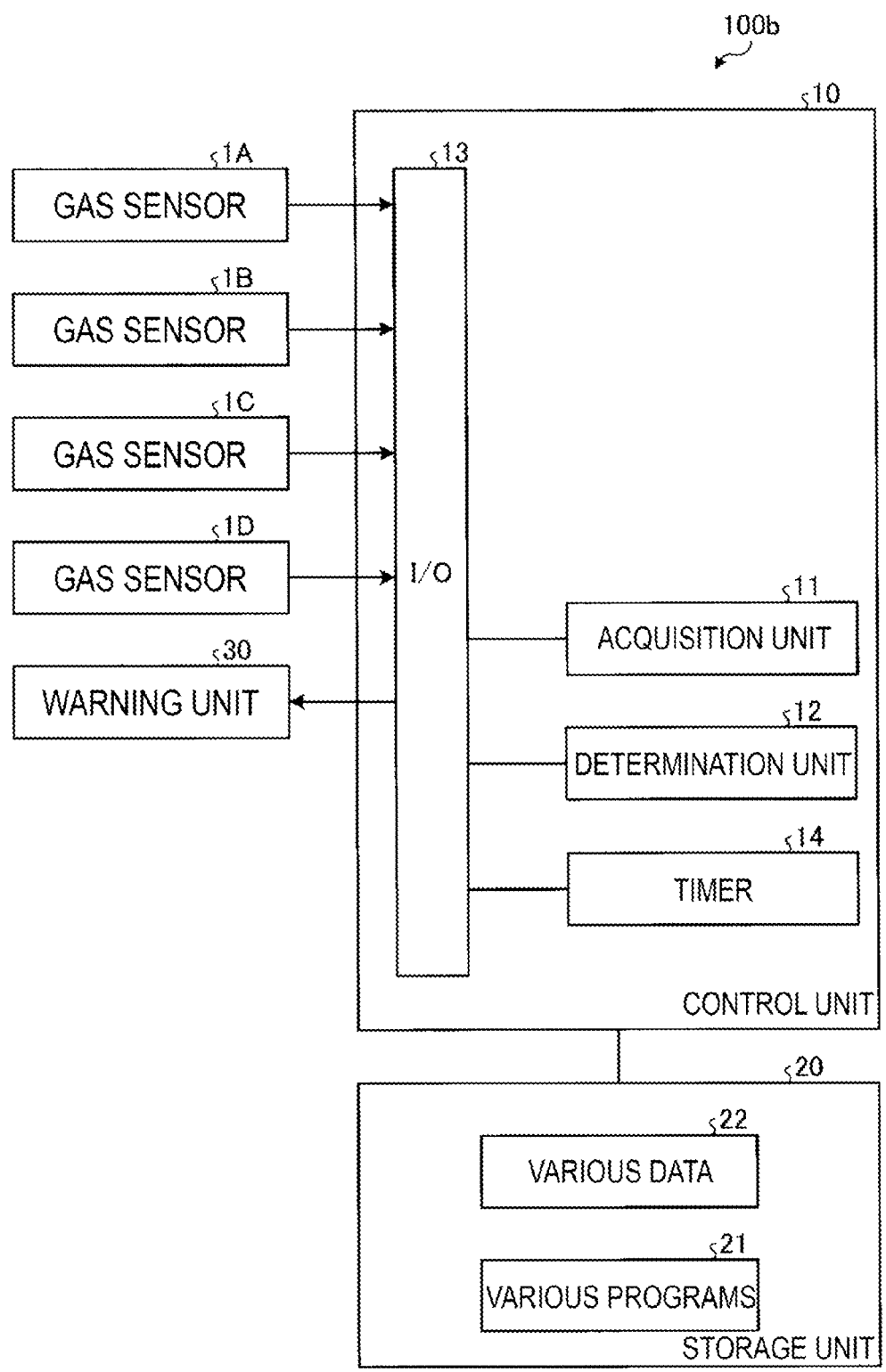
FIG. 12 is a diagram illustrating an example of an abnormality monitoring system that determines in consideration of a time element.

FIG. 12 is a diagram illustrating an example of an abnormality monitoring system 100b that determines in consideration of a time element. In FIG. 12, the difference between the abnormality monitoring system 100b and the abnormality monitoring system 100 described with reference to FIG. 3 is that the control unit 10 includes a timer 14. The timer 14 measures the time elapsed from the time point of the detection by the gas sensor.

Figure 13:
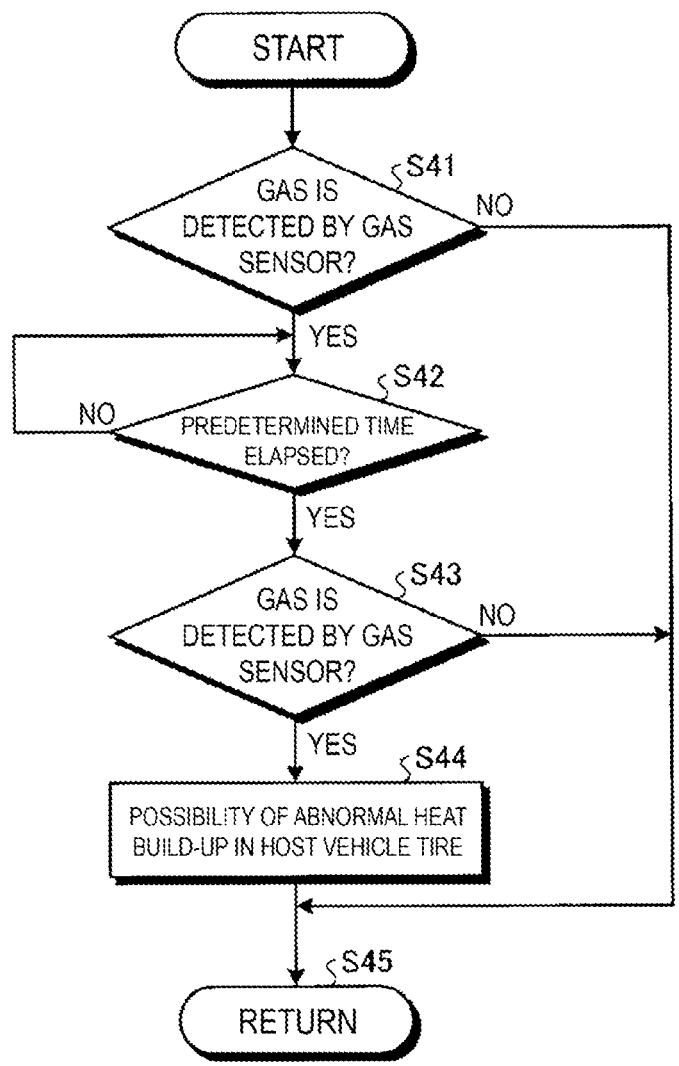
FIG. 13 is a flowchart illustrating an example of a determination operation of an abnormality monitoring system.

FIG. 13 is a flowchart illustrating an example of the determination operation of the abnormality monitoring system 100b. In this example, the determination operation of FIG. 13 is performed as a subroutine for the main operation illustrated in FIG. 4.

In FIG. 13, the abnormality monitoring system 100b determines whether gas has been detected by any of the gas sensors (step S41). As a result of the determination in step S41, when the gas has been detected by any of the gas sensors (Yes in step S41), the abnormality monitoring system 100b measures the time using the timer 14 (step S42), and waits for processing until a predetermined time has elapsed (No in step S42).

When the predetermined time by the timer 14 has elapsed (Yes in step S42), the abnormality monitoring system 100b determines whether gas has been detected in the same gas sensor again (step S43). As a result of the determination in step S43, when the gas has been detected again in the same gas sensor (Yes in step S43), the abnormality monitoring system 100b determines that there is a possibility of abnormal heat build-up in the tire of the host vehicle (step S44). After that, the abnormality monitoring system 100b returns to the main operation illustrated in FIG. 4 (step S45).

As a result of the determination in step S41, when no gas has been detected by any of the gas sensors (No in step S41), the abnormality monitoring system 100b returns to the main operation illustrated in FIG. 4 (step S45). As a result of the determination in step S43, when the gas has not been detected in the same gas sensor (No in step S43), the abnormality monitoring system 100b returns to the main operation illustrated in FIG. 4 (step S45).

According to the above-described operation, it is determined that there is a possibility of abnormal heat build-up in the tire of the host vehicle when, after gas is detected by a gas sensor, the same gas is detected again in the gas sensor after a predetermined time has elapsed. Thus, the possibility of erroneous detection of the gas sensor can be eliminated and the possibility of abnormal heat build-up in the tire of the host vehicle can be more accurately determined.

Figure 14:
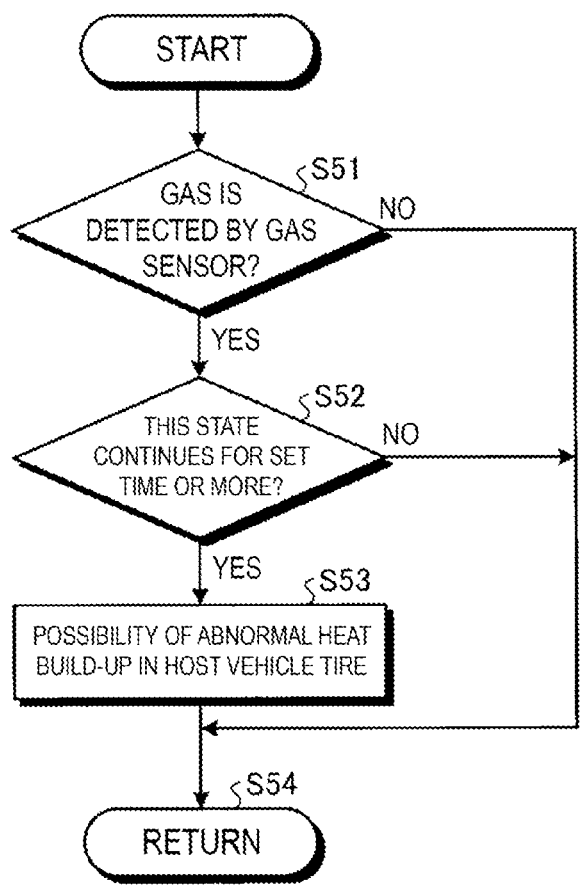
FIG. 14 is a flowchart illustrating another example of a determination operation of the abnormality monitoring system.

FIG. 14 is a flowchart illustrating another example of the determination operation of the abnormality monitoring system 100b. In this example, the determination operation of FIG. 14 is performed as a subroutine for the main operation illustrated in FIG. 4.

In FIG. 14, the abnormality monitoring system 100b determines whether gas has been detected by any of the gas sensors (step S51). As a result of the determination in step S51, when the gas has been detected by any of the gas sensors (Yes in step S51), the abnormality monitoring system 100b measures the time using the timer 14 and determines whether or not to continue detecting the gas in the same gas sensor until a predetermined or set time elapses (step S52).

When the gas is continuously detected in the same gas sensor until a predetermined or set time by the timer 14 elapses (Yes in step S52), the abnormality monitoring system 100b determines that there is a possibility of abnormal heat build-up in the tire of the host vehicle (step S53). After that, the abnormality monitoring system 100 returns to the main operation illustrated in FIG. 4 (step S54).

As a result of the determination in step S51, when no gas has been detected by any of the gas sensors (No in step S51), the abnormality monitoring system 100b returns to the main operation illustrated in FIG. 4 (step S54). As a result of the determination in step S52, when the gas has not been detected in the same gas sensor before the predetermined or set time elapses (No in step S52), the abnormality monitoring system 100b returns to the main operation illustrated in FIG. 4 (step S54).

According to the above-described operation, it is determined that there is a possibility of abnormal heat build-up in the tire of the host vehicle only when, after gas is detected by the gas sensor, the gas is detected continuously for a predetermined or set time. Thus, the possibility of erroneous detection or the like of the gas sensor can be eliminated and the possibility of abnormal heat build-up in the tire of the host vehicle can be more accurately determined. Also in this case, it is determined that there is a possibility of abnormal heat build-up in the tire of the host vehicle when, after gas is detected by the gas sensor, the same gas is detected by the gas sensor after a predetermined or set period of time elapses.

When Using Pair of Multiple Types of Gases and Gas Sensors

By the way, a plurality of pairs of a plurality of types of gases to be detected and gas sensors may be prepared, and when gas has been detected by all pairs of gas sensors, it may be determined that there is a possibility of abnormal heat build-up in the tire of the host vehicle. For example, a pair of a gas A and a gas sensor a that detects this gas A and a pair of another gas B and another gas sensor b that detects this gas B are prepared. Both gases A and B are gases produced by substances volatilizing from the tire. Then, the gas sensors a and b are provided in the vicinity of the same tire. When the gas sensor a detects the gas A and the gas sensor b detects the gas B, it is determined that there is a possibility of abnormal heat build-up in the tire. Note that different substances may be added to different places, such as adding the substance corresponding to gas A to the cap rubber of the tread of the tire and adding the substance corresponding to gas B to the side rubber of the tire. By doing so, it can be seen that the tread of the tire has generated abnormal heat when the gas A is detected, and the side rubber of the tire has generated abnormal heat when the gas B is detected. In other words, the section of abnormal heat build-up in the tire can be identified by the detected gas.

Figure 15:
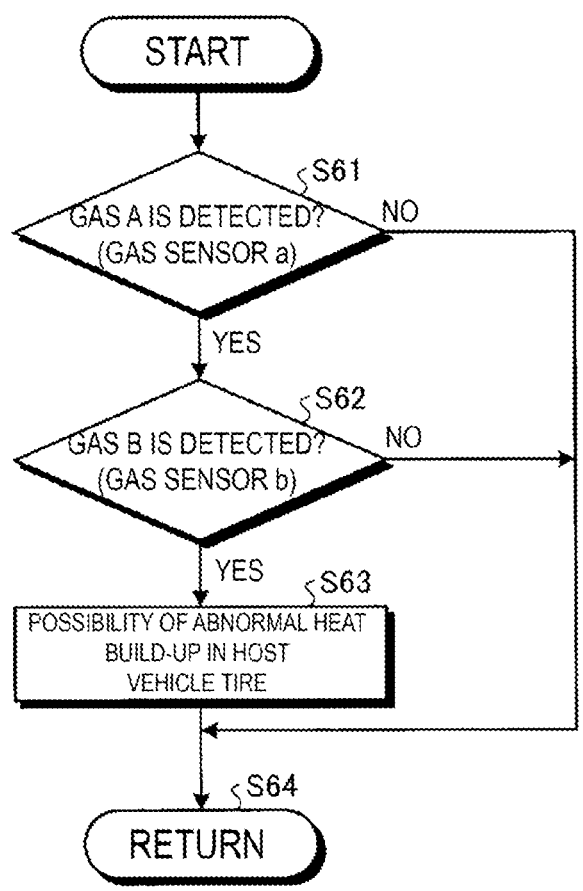
FIG. 15 is a flowchart illustrating an example of a determination operation of an abnormality monitoring system.

FIG. 15 is a flowchart illustrating an example of a determination operation of the abnormality monitoring system 100. In this example, the determination operation of FIG. 15 is performed as a subroutine for the main operation illustrated in FIG. 4.

In FIG. 15, the abnormality monitoring system 100 determines whether the gas A has been detected by the gas sensor a (step S61). As a result of the determination in step S61, when the gas A has been detected by the gas sensor a (Yes in step S61), the abnormality monitoring system 100 determines whether the gas B has been detected by the gas sensor b (step S62). As a result of the determination in step S62, when the gas B has been detected by the gas sensor b (Yes in step S62), the abnormality monitoring system 100 determines that there is a possibility of abnormal heat build-up in the tire of the host vehicle (step S63). After that, the abnormality monitoring system 100 returns to the main operation illustrated in FIG. 4 (step S64).

As a result of the determination in step S61, when the gas A has not been detected by the gas sensor a (No in step S61), the abnormality monitoring system 100 returns to the main operation illustrated in FIG. 4 (step S64). As a result of the determination in step S62, when the gas B has not been detected by the gas sensor b (No in step S62), the abnormality monitoring system 100 returns to the main operation illustrated in FIG. 4 (step S64).

According to the above-described operation, it is determined that there is a possibility of abnormal heat build-up in the tire of the host vehicle when gas has been detected by all the pairs of gas sensors. Thus, the possibility of erroneous detection or the like of the gas sensor can be eliminated and the possibility of abnormal heat build-up in the tire of the host vehicle can be more accurately determined.

Figure 16:
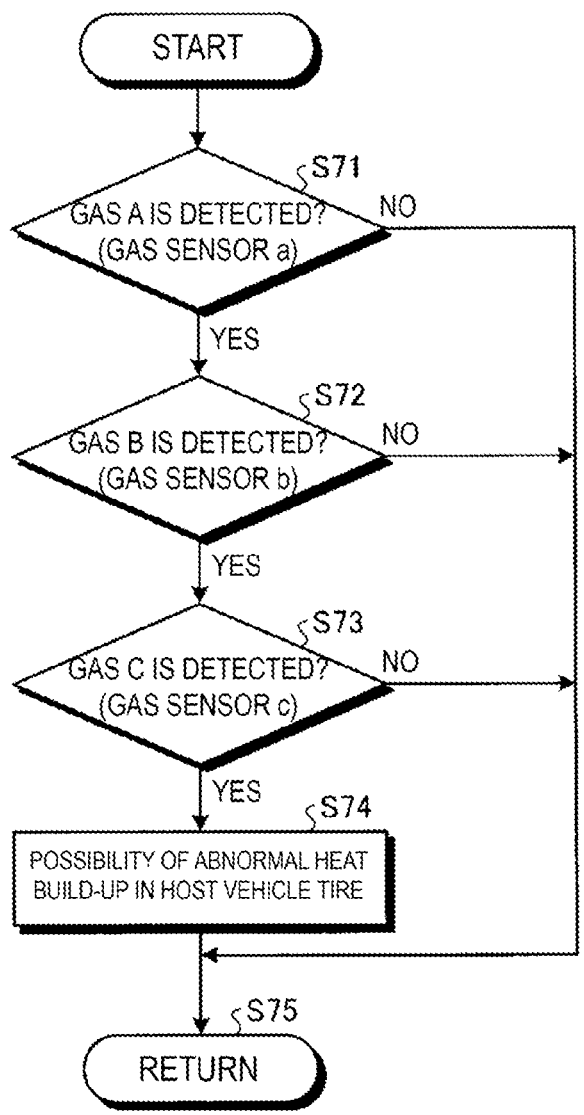
FIG. 16 is a flowchart illustrating an example of a determination operation of an abnormality monitoring system.

The number of pairs of the plurality of types of gas to be detected and the gas sensors may be increased. FIG. 16 is a flowchart illustrating an example of a determination operation of the abnormality monitoring system 100. In this example, the determination operation of FIG. 16 is performed as a subroutine for the main operation illustrated in FIG. 4.

In FIG. 16, the abnormality monitoring system 100 determines whether the gas A has been detected by the gas sensor a (step S71). As a result of the determination in step S71, when the gas A has been detected by the gas sensor a (Yes in step S71), the abnormality monitoring system 100 determines whether the gas B has been detected by the gas sensor b (step S72). As a result of the determination in step S72, when the gas B has been detected by the gas sensor b (Yes in step S72), the abnormality monitoring system 100 further determines whether a gas C has been detected by another gas sensor c (step S73). As a result of the determination in step S73, when the gas C has been detected by the gas sensor c (Yes in step S73), the abnormality monitoring system 100 determines that there is a possibility of abnormal heat build-up in the tire of the host vehicle (step S74). After that, the abnormality monitoring system 100 returns to the main operation illustrated in FIG. 4 (step S75).

As a result of the determination in step S71, when the gas A has not been detected by the gas sensor a (No in step S71), the abnormality monitoring system 100 returns to the main operation illustrated in FIG. 4 (step S75). As a result of the determination in step S72, when the gas B has not been detected by the gas sensor b (No in step S72), the abnormality monitoring system 100 returns to the main operation illustrated in FIG. 4 (step S75). As a result of the determination in step S73, when the gas C has not been detected by the gas sensor c (No in step S73), the abnormality monitoring system 100 returns to the main operation illustrated in FIG. 4 (step S75).

According to the above-described operation, it is determined that there is a possibility of abnormal heat build-up in the tire of the host vehicle when gas has been detected by all the pairs of gas sensors. Thus, the possibility of erroneous detection or the like of the gas sensor can be eliminated and the possibility of abnormal heat build-up in the tire of the host vehicle can be more accurately determined.

By the way, a substance that is not originally used for manufacturing tires may be added to the tire, and gases that volatilize from the substance may be detected. When the substance is unique for each tire, a tire having the possibility of abnormal heat build-up can be identified by detecting a volatilizing gas. In other words, a substance that volatilizes a specific gas is added to the tire, and a pair of the gas and the gas sensor is prepared. By setting a specific gas as a gas unique for each tire, a tire having the possibility of abnormal heat build-up can be more accurately identified on the basis of the detected gas. Furthermore, when two or more types of substances are uniquely combined for each tire and added to the tire, a tire having the possibility of abnormal heat build-up can be identified for a vehicle provided with multiple tires by a combination of gases detected by a gas sensor.

Figure 17:
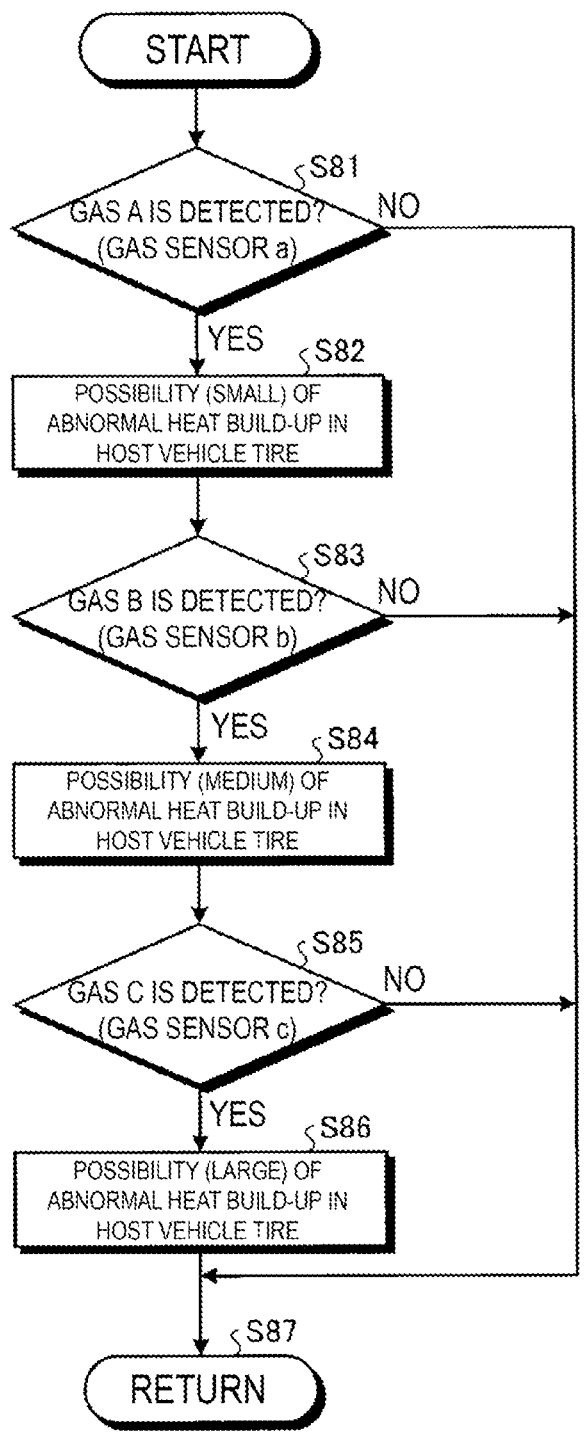
FIG. 17 is a flowchart illustrating an example of a determination operation of an abnormality monitoring system.

A plurality of pairs of a plurality of types of gases to be detected and gas sensors may be prepared, and a warning may be output whenever one gas sensor in the pair detects a gas. At this time, it is preferable to output a stepwise warning of the extent of the possibility of abnormal heat build-up. FIG. 17 is a flowchart illustrating an example of a determination operation of the abnormality monitoring system 100. In this example, the determination operation of FIG. 17 is performed as a subroutine for the main operation illustrated in FIG. 4.

In FIG. 17, the abnormality monitoring system 100 determines whether the gas A has been detected by the gas sensor a (step S81). As a result of the determination in step S81, when the gas A is detected by the gas sensor a (Yes in step S81), the abnormality monitoring system 100 determines that there is a possibility of abnormal heat build-up in the tire of the host vehicle (step S82). The possibility of abnormal heat build-up at this stage is "small". At this time, the abnormality monitoring system 100 outputs a warning indicating that the possibility of abnormal heat build-up is "small".

The abnormality monitoring system 100 determines whether the gas B has been detected by the gas sensor b (step S83). As a result of the determination in step S83, when the gas B has been detected by the gas sensor b (Yes in step S83), the abnormality monitoring system 100 determines that there is a possibility of abnormal heat build-up in the tire of the host vehicle (step S84). The possibility of abnormal heat build-up at this stage is "medium". At this time, the abnormality monitoring system 100 outputs a warning indicating that the possibility of abnormal heat build-up is "medium".

The abnormality monitoring system 100 determines whether the gas C has been detected by the gas sensor c (step S85). As a result of the determination in step S85, when the gas C has been detected by the gas sensor c (Yes in step S85), the abnormality monitoring system 100 determines that there is a possibility of abnormal heat build-up in the tire of the host vehicle (step S86). The possibility of abnormal heat build-up at this stage is "large". At this time, the abnormality monitoring system 100 outputs a warning indicating that the possibility of abnormal heat build-up is "large". After that, the abnormality monitoring system 100 returns to the main operation illustrated in FIG. 4 (step S87).

As a result of the determination in step S81, when the gas A has not been detected by the gas sensor a (No in step S81), the abnormality monitoring system 100 returns to the main operation illustrated in FIG. 4 (step S87). As a result of the determination in step S83, when the gas B has not been detected by the gas sensor b (No in step S83), the abnormality monitoring system 100 returns to the main operation illustrated in FIG. 4 (step S87). As a result of the determination in step S85, when the gas C has not been detected by the gas sensor c (No in step S85), the abnormality monitoring system 100 returns to the main operation illustrated in FIG. 4 (step S87).

Abnormality Monitoring System that Determines in Consideration of Vehicle Speed

By the way, since the speed of the airflow in the tire housing varies depending on the travel speed of a vehicle, the diffusion state of the gas generated from the tire is different. When the travel speed of the vehicle is high, the speed of the airflow in the tire housing is high. When the travel speed of the vehicle is low, the speed of the airflow in the tire housing is low. As a result, the travel speed of the vehicle affects the detection result of the gas sensor, and there is a possibility that an error occurs in the determination. In addition, when the vehicle is stopped on a road or during traffic congestion, gases volatilizing from the tires of other vehicles and the environment around the vehicle may affect the detection results of the gas sensors, which may cause errors in the determination.

In order to avoid such a determination error and make an appropriate determination, a speed sensor may be added and determination may be made in consideration of the vehicle speed. In this case, for example, the abnormality of the tire temperature is determined using different threshold values depending on whether the travel speed of the vehicle is less than a predetermined speed or equal to or higher than the predetermined speed. The predetermined speed is preferably set, for example, from 5 km/h to 60 km/h. The predetermined speed may be set to two stages, and two types of threshold values may be used. Additionally, a wind speed sensor may be added and determination may be made in consideration of the wind speed at the position of the host vehicle.

Figure 18:
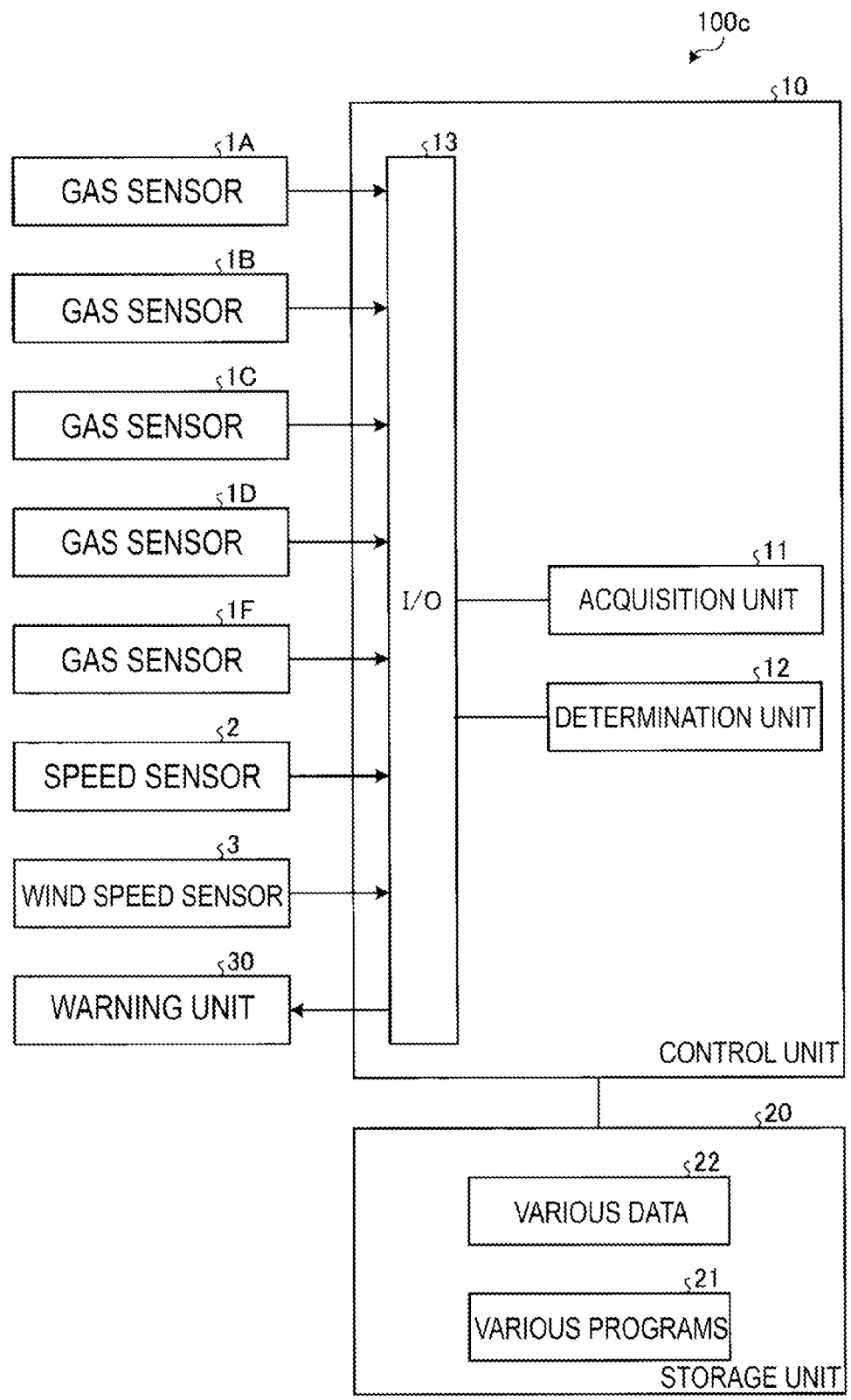
FIG. 18 is a diagram illustrating an example of an abnormality monitoring system that determines in consideration of the travel speed of the vehicle.

FIG. 18 is a diagram illustrating an example of an abnormality monitoring system 100c that determines in consideration of the travel speed of the vehicle. In FIG. 18, the difference between the abnormality monitoring system 100c and the abnormality monitoring system 100 described with reference to FIG. 3 is that the abnormality monitoring system 100c includes a speed sensor 2 and a wind speed sensor 3. The speed sensor 2 detects the travel speed of the host vehicle. The wind speed sensor 3 detects the wind speed at the position of the host vehicle.

Figure 19:
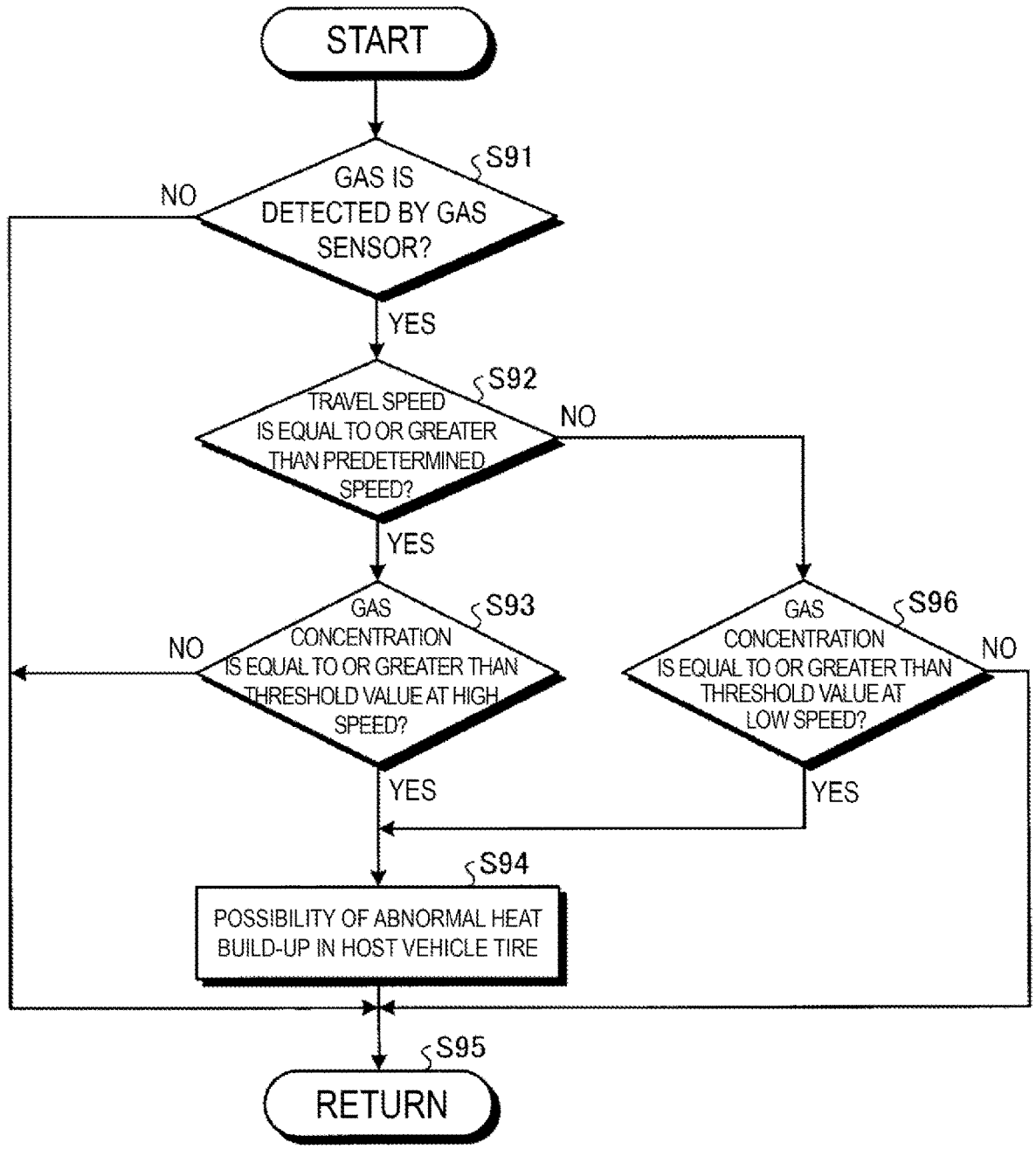
FIG. 19 is a flowchart illustrating an example of a determination operation of an abnormality monitoring system.

FIG. 19 is a flowchart illustrating an example of a determination operation of the abnormality monitoring system 100c. In this example, the determination operation of FIG. 19 is performed as a subroutine for the main operation illustrated in FIG. 4.

In FIG. 19, the abnormality monitoring system 100c determines whether gas has been detected by any of the gas sensors (step S91). As a result of the determination in step S91, when the gas has been detected by any of the gas sensors (Yes in step S91), the abnormality monitoring system 100c determines whether the travel speed detected by the speed sensor 2 is equal to or greater than a predetermined speed (step S92).

As a result of the determination in step S92, when the travel speed is equal to or greater than the predetermined speed (Yes in step S92), the abnormality monitoring system 100c uses a threshold value at high speed and determines whether the gas concentration detected by the gas sensor is equal to or greater than the threshold value at high speed (step S93). As a result of the determination in step S93, when the gas concentration detected by the gas sensor is equal to or greater than the threshold value at high speed (Yes in step S93), the abnormality monitoring system 100c determines that there is a possibility of abnormal heat build-up in the tire of the host vehicle (step S94). After that, the abnormality monitoring system 100c returns to the main operation illustrated in FIG. 4 (step S95).

Furthermore, as a result of the determination in step S92, when the travel speed is not equal to or greater than the predetermined speed (No in step S92), the abnormality monitoring system 100c uses a threshold value at low speed and determines whether the concentration of gas detected by the gas sensor is equal to or greater than the threshold value at low speed (step S96). As a result of the determination in step S96, when the gas concentration detected by the gas sensor is equal to or greater than the threshold value at low speed (Yes in step S96), the abnormality monitoring system 100c determines that there is a possibility of abnormal heat build-up in the tire of the host vehicle (step S94). After that, the abnormality monitoring system 100c returns to the main operation illustrated in FIG. 4 (step S95).

When no gas has been detected by any of the gas sensors (No in step S91) as a result of the determination in step S91, when the gas concentration detected by the gas sensor is not equal to or greater than the threshold value at high speed (No in step S93) as a result of the determination in step S93, or when the gas concentration detected by the gas sensor is not equal to or greater than the threshold value at low speed (No in step S96) as a result of the determination in step S96, the abnormality monitoring system 100c returns to the main operation illustrated in FIG. 4 (step S95).

As described above, by changing the threshold value according to the vehicle speed, determination in consideration of the influence can be made. Note that since the speed of the airflow in the tire housing is affected by the wind speed, the detection result of the wind speed sensor 3 may be used. The determination unit 12 may use different threshold values for determination depending on whether the wind speed detected by the wind speed sensor 3 is equal to or greater than a predetermined value or less than the predetermined value.

Abnormality Monitoring System that Determines in Consideration of Air Pressure and Temperature of Tire An air pressure sensor or a temperature sensor may be added to detect the air pressure and temperature of the tire, and the determination unit 12 may make a determination in consideration of the detection results.

Figure 20:
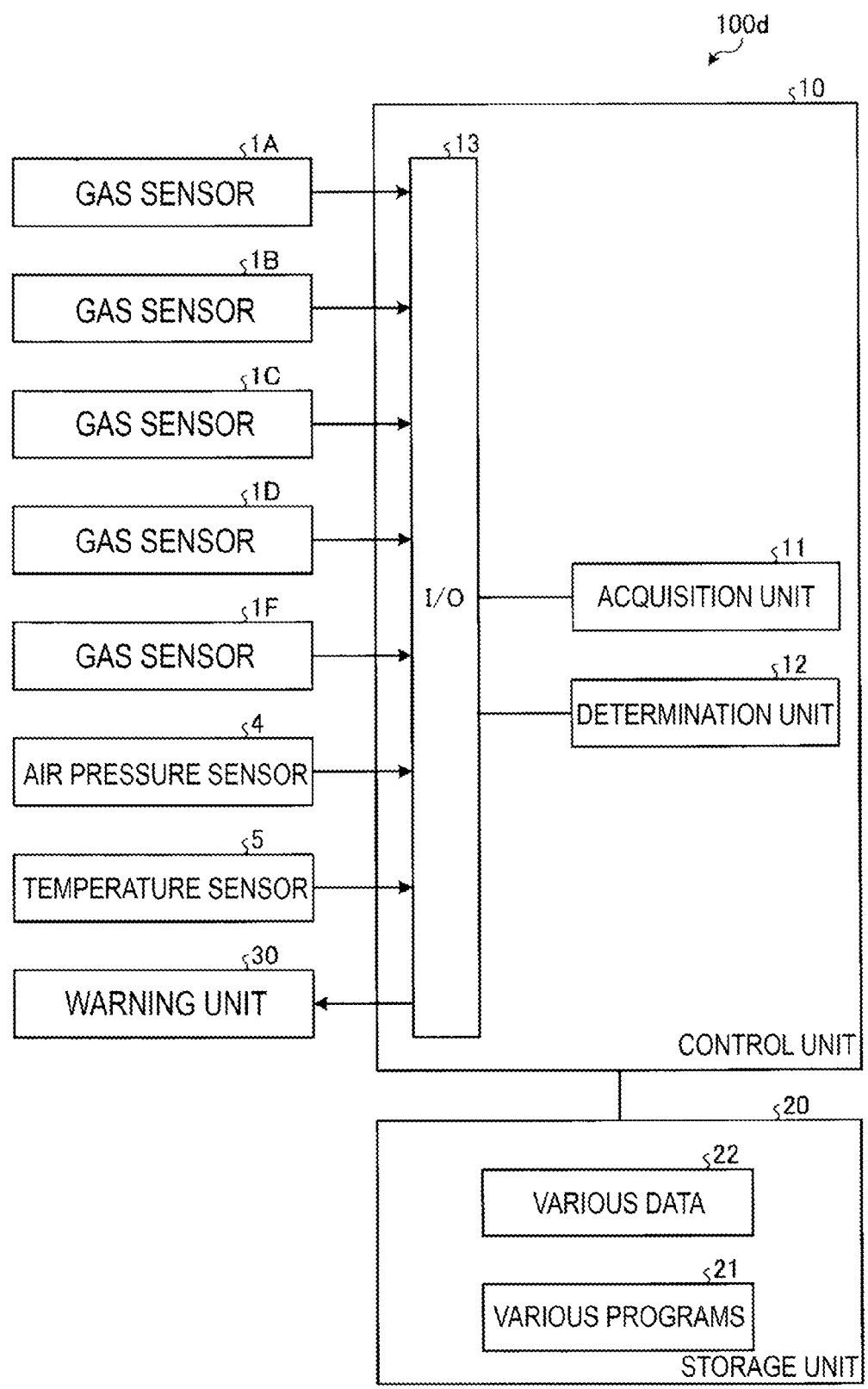
FIG. 20 is a diagram illustrating an example of an abnormality monitoring system that determines in consideration of the air pressure and temperature of the tire.

FIG. 20 is a diagram illustrating an example of an abnormality monitoring system 100d that determines in consideration of the air pressure and temperature of the tire. In FIG. 20, the difference between the abnormality monitoring system 100d and the abnormality monitoring system 100 described with reference to FIG. 3 is that the abnormality monitoring system 100d includes an air pressure sensor 4 and a temperature sensor 5. The air pressure sensor 4 is installed in the cavity of each tire and measures the air pressure of the tire. The temperature sensor 5 is, for example, a sensor installed side by side to the housing of the air pressure sensor 4 to measure the temperature of the air in the tire cavity. Further, the temperature sensor 5 may be a non-contact sensor that measures the temperature of the outer surface of the tire. When the air pressure sensor 4 is already provided, it is preferable to add a temperature sensor 5 in the housing. By doing so, the air pressure sensor 4 and the temperature sensor 5 can share a power supply. Note that since the air pressure in the tire cavity increases as the temperature in the tire cavity increases, measuring both the air pressure and the temperature may appear to be redundant. In reality, the air pressure may decrease due to a puncture (or a slow leak) of a tire, which may increase the tire deflection and generate heat. Thus, it is effective to measure both air pressure and temperature in order to detect such a case.

In this example, the air pressure sensor 4 that detects the air pressure of the tire is further included, and the abnormality in the temperature of the tire is determined using the detection results of the gas sensors 1A to 1D and the measurement value of the air pressure sensor 4. As the temperature increases, the air in the tire cavity may also be warmed and the air pressure may increase. Accordingly, the detection accuracy is improved by determining the abnormality in the temperature of the tire using both the gas detection result of the gas sensor and the air pressure measurement result of the air pressure sensor. When the tire generates abnormal heat, since the air pressure of the tire also increases, the detection accuracy can be increased using both the gas detection result and the measurement result of the air pressure sensor.

Figure 21:
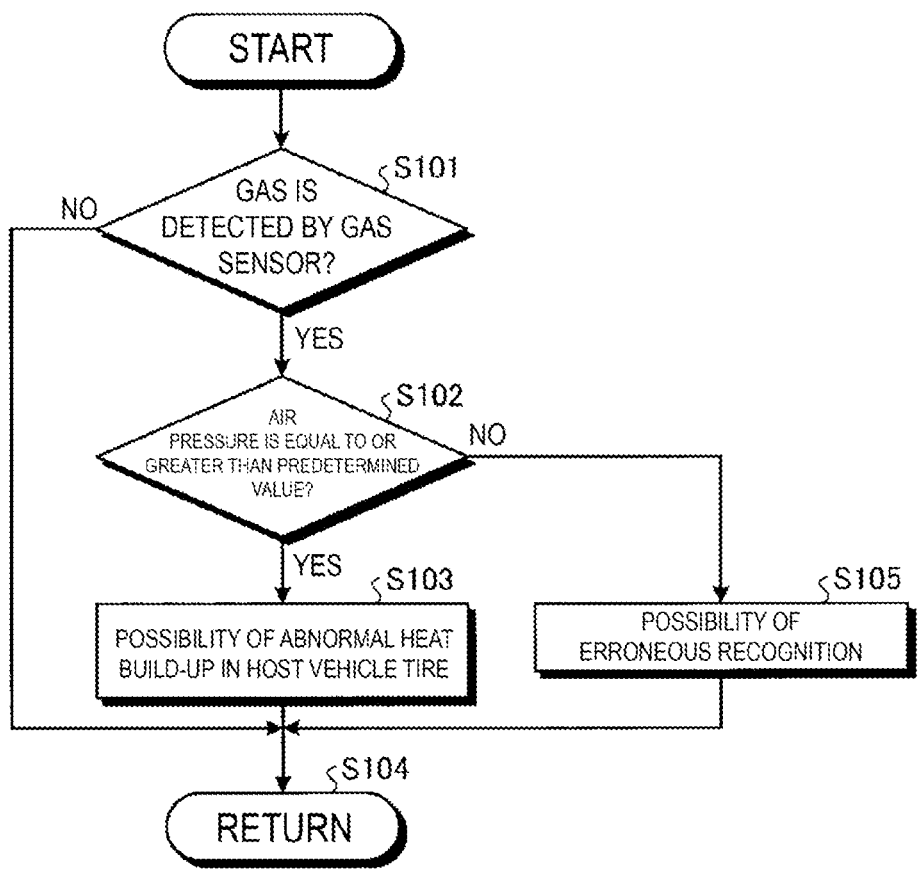
FIG. 21 is a flowchart illustrating an example of a determination operation of an abnormality monitoring system.

FIG. 21 is a flowchart illustrating an example of a determination operation of the abnormality monitoring system 100d. In this example, the determination operation of FIG. 21 is performed as a subroutine for the main operation illustrated in FIG. 4.

In FIG. 21, the abnormality monitoring system 100d determines whether gas has been detected by any of the gas sensors (step S101). As a result of the determination in step S101, when the gas has been detected by any of the gas sensors (Yes in step S101), the abnormality monitoring system 100d determines whether the value of the air pressure detected by the air pressure sensor 4 is equal to or greater than a predetermined value (step S102).

As a result of the determination in step S102, when the value of the air pressure is equal to or greater than the predetermined value (Yes in step S102), the abnormality monitoring system 100d determines that there is a possibility of abnormal heat build-up in the tire of the host vehicle (step S103). After that, the abnormality monitoring system 100d returns to the main operation illustrated in FIG. 4 (step S104).

As a result of the determination in step S102, when the value of the air pressure is not equal to or greater than the predetermined value (No in step S102), the abnormality monitoring system 100d determines that there is a possibility of erroneous recognition due to environmental factors around the vehicle (step S105). After that, the abnormality monitoring system 100d returns to the main operation illustrated in FIG. 4 (step S104).

As a result of the determination in step S101, when no gas has been detected by any of the gas sensors (No in step S101), the abnormality monitoring system 100d returns to the main operation illustrated in FIG. 4 (step S104).

By the way, in step S102 in FIG. 21, a determination may be made in consideration of the value of the temperature detected by the temperature sensor 5. For example, when the value of the air pressure detected by the air pressure sensor 4 is equal to or greater than the predetermined value and the value of the temperature detected by the temperature sensor 5 is equal to or greater than the predetermined value, the process may proceed to step S103. When the value of the air pressure detected by the air pressure sensor 4 is not equal to or greater than the predetermined value or the value of the temperature detected by the temperature sensor 5 is not equal to or greater than the predetermined value, the process may proceed to step S105.

Figure 22:
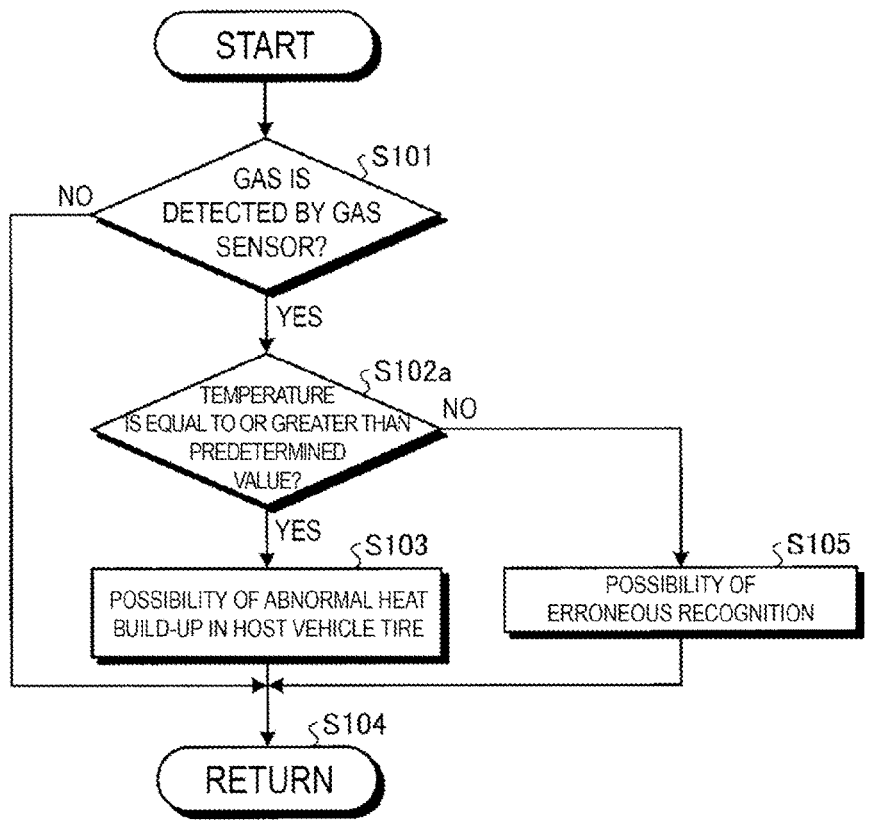
FIG. 22 is a flowchart illustrating another example of a determination operation of the abnormality monitoring system.

Further, in step S102 of FIG. 21, the determination may be made in consideration of the temperature value detected by the temperature sensor 5 without taking the air pressure value detected by the air pressure sensor 4 into consideration. FIG. 22 is a flowchart illustrating another example of the determination operation of the abnormality monitoring system 100d. In this example, the determination operation of FIG. 22 is performed as a subroutine for the main operation illustrated in FIG. 4.

In FIG. 22, the abnormality monitoring system 100d determines whether gas has been detected by any of the gas sensors (step S101). As a result of the determination in step S101, when the gas has been detected by any of the gas sensors (Yes in step S101), the abnormality monitoring system 100d determines whether the value of the temperature detected by the temperature sensor 5 is equal to or greater than a predetermined value (step S102a).

As a result of the determination in step S102a, when the value of the temperature is equal to or greater than the predetermined value (Yes in step S102a), the abnormality monitoring system 100d determines that there is a possibility of abnormal heat build-up in the tire of the host vehicle (step S103). After that, the abnormality monitoring system 100d returns to the main operation illustrated in FIG. 4 (step S104).

As a result of the determination in step S102a, the value of the temperature is not equal to or greater than the predetermined value (No in step S102a), the abnormality monitoring system 100d determines that there is a possibility of erroneous recognition due to environmental factors around the vehicle (step S105). After that, the abnormality monitoring system 100d returns to the main operation illustrated in FIG. 4 (step S104).

As a result of the determination in step S101, when no gas has been detected by any of the gas sensors (No in step S101), the abnormality monitoring system 100d returns to the main operation illustrated in FIG. 4 (step S104).

Gas Sensor

A gas sensor suitable for use in the abnormality monitoring system detects a substance that volatilizes as the temperature increases among substances contained in a tire. By performing gas sensing on the volatilizing substance, an abnormal increase in the temperature of the tire can be detected at low cost. The gas sensor may be a semiconductor gas sensor, an electrochemical gas sensor, a biosensor type, or the like.

The gas that the gas sensor can detect is determined in advance and the specific gas is detected. There is a one-to-one correspondence between the gas to be detected and the gas sensor. When a plurality of types of mutually different gases is detected by a gas sensor, it is necessary to prepare a gas sensor corresponding to each of the gases to be detected. In other words, a plurality of pairs of gas and gas sensors must be prepared.

Detection by Gas Sensor

Some substances contained in the additives blended in the tire undergo a chemical reaction and have different molecular structures from those at the time of blending, but some substances remain unreacted. In addition, some substances contained in the additive may volatilize without changing their molecular structures, but in most cases, a part (for example, a group) of the molecular structure is separated and volatilized. Thus, the molecular structure of a substance X contained in a certain additive and a volatile substance X' derived therefrom are not always the same. A substance X that volatilizes without changing its molecular structure and a substance X' of which a part of the molecular structure is separated and volatilized are both substances derived from the substance X.

Figure 23:
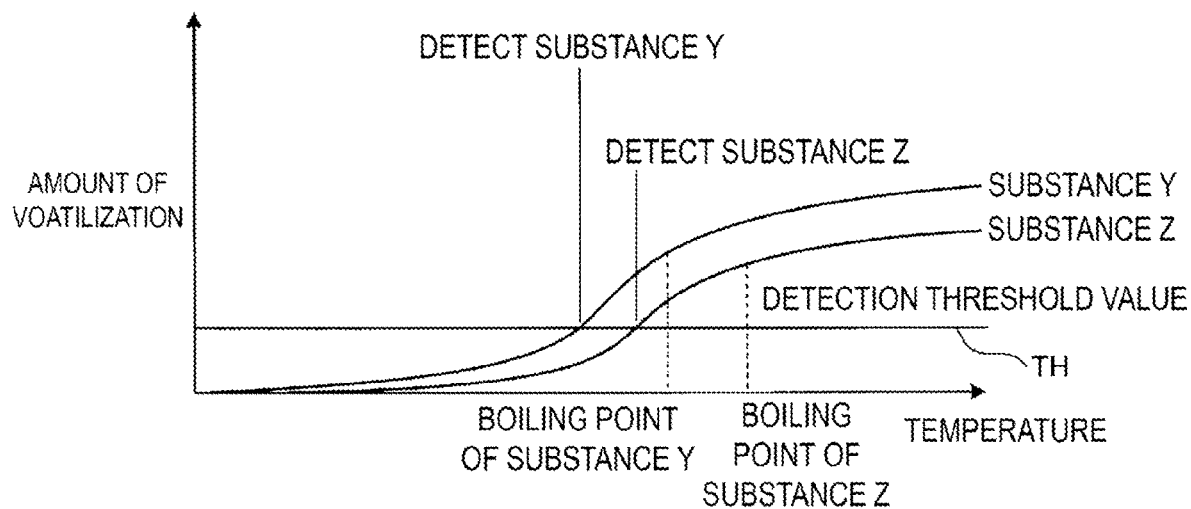
FIG. 23 is a diagram illustrating an example of a change in the amount of volatilization with respect to a change in temperature.

In addition, the easiness of volatilization differs depending on the substance, and a substance that is easy to volatilize volatilizes at a temperature lower than the temperature at which it reaches the boiling point. FIG. 23 is a diagram illustrating an example of a change in the amount of volatilization with respect to a change in temperature. FIG. 23 illustrates an example of a change in the amount of volatilization of substances Y and Z which are additives. The substances Y and Z each have a unique boiling point. The substances Y and Z are detected by the corresponding gas sensors.

As illustrated in FIG. 23, the substances Y and Z start volatilization at a temperature lower than the temperature at which they reach their boiling points. After that, when the temperature of the tire increases, the amount of volatilization of the substances Y and Z increases, and the concentration of the gas increases. The amount of volatilization of the substances Y and Z is proportional to the concentration detected by the gas sensor. When the amount of volatilization of the substance Y exceeds a detection threshold value TH of the corresponding gas sensor, the substance Y is detected by the gas sensor. When the amount of volatilization of the substance Z exceeds a detection threshold value TH of the corresponding gas sensor, the substance Z is detected by the gas sensor.

As illustrated in FIG. 23, when the temperature of the tire is gradually increased, the concentration at which a substance volatilizes has a width with respect to the temperature. For this reason, a threshold value is set for concentration detection in the gas sensor, and the case where the concentration exceeds the threshold value is called "detection", and the time when the volatilization of the substance is started is not "detection".

Examples of Substances Detected by Gas Sensors

Figure 24:
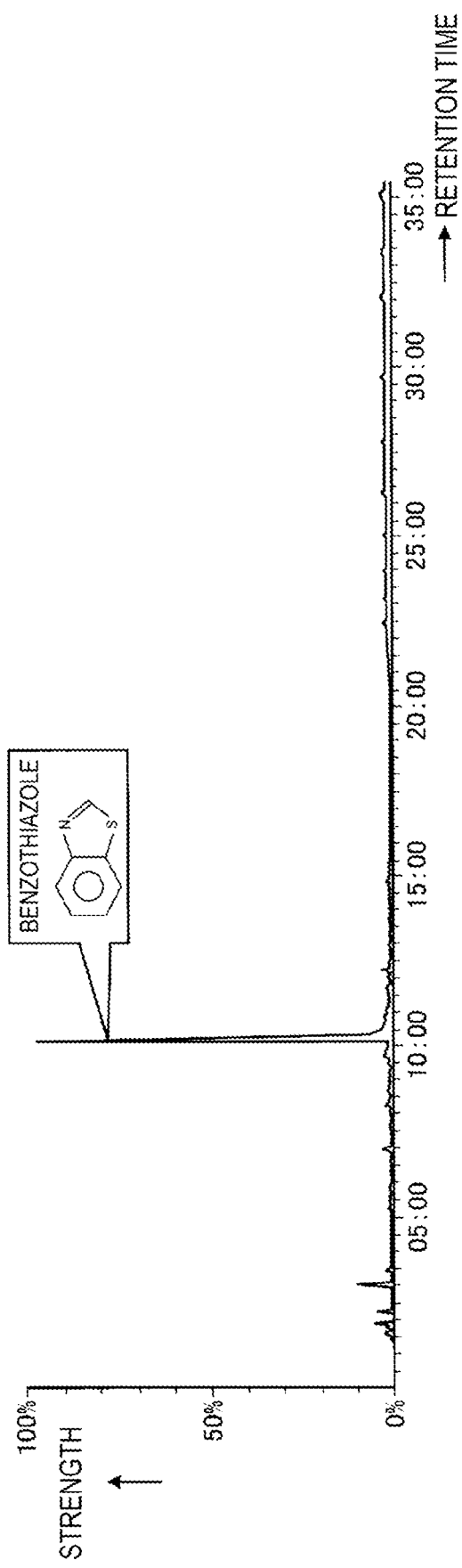
FIG. 24 is a diagram illustrating an example of a chromatogram obtained by gas chromatography.
Figure 25:
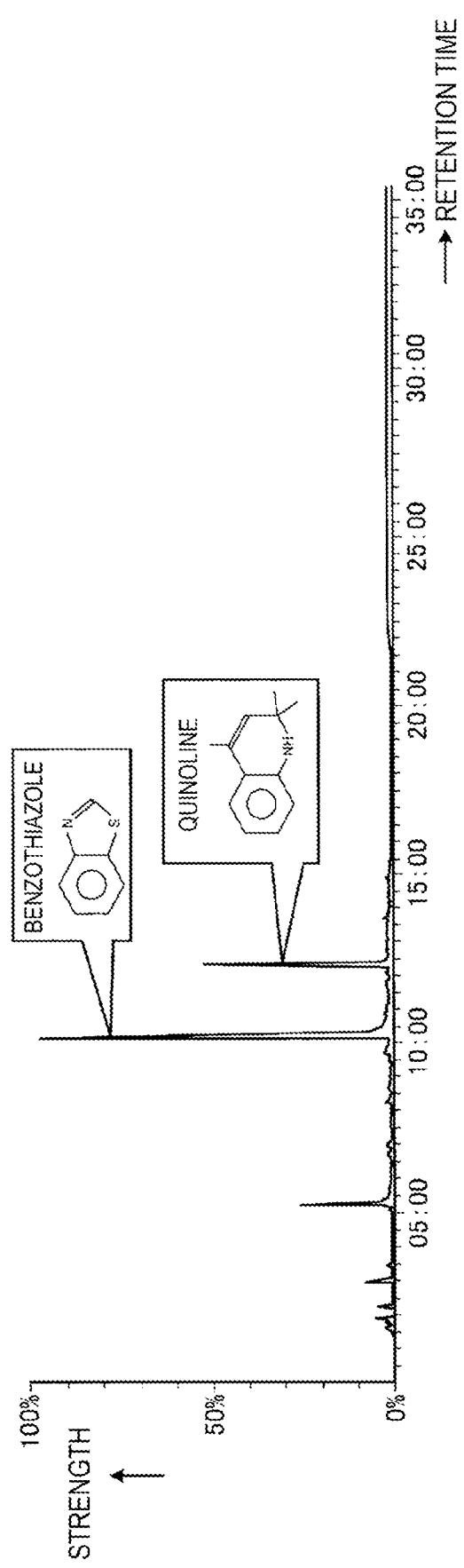
FIG. 25 is a diagram illustrating an example of a chromatogram obtained by gas chromatography.
Figure 26:
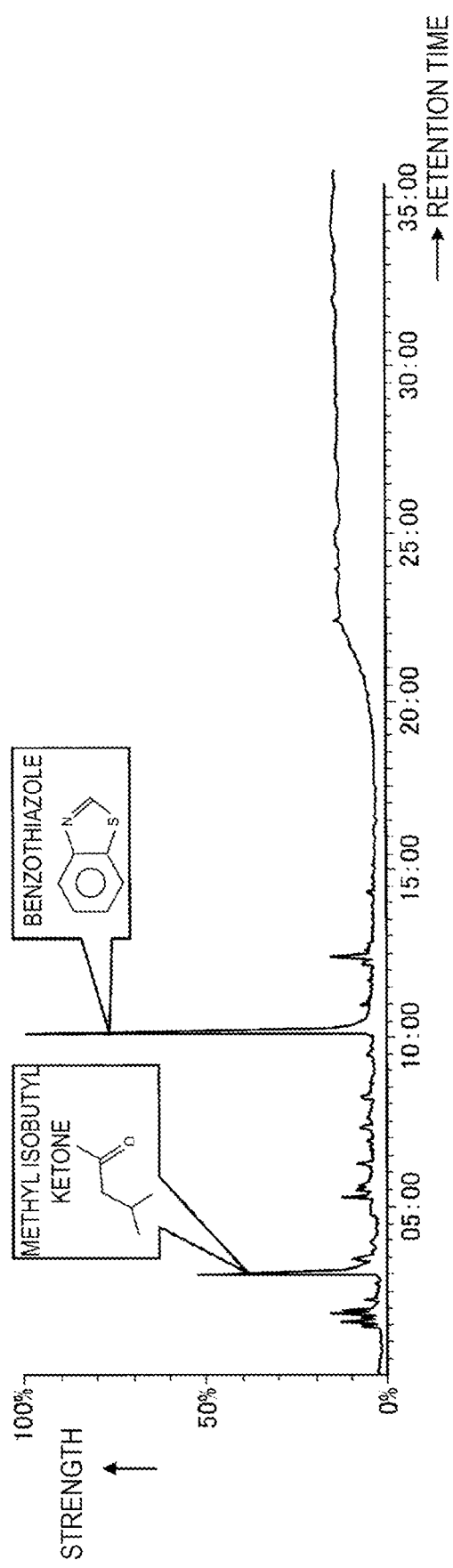
FIG. 26 is a diagram illustrating an example of a chromatogram obtained by gas chromatography.
Figure 27:
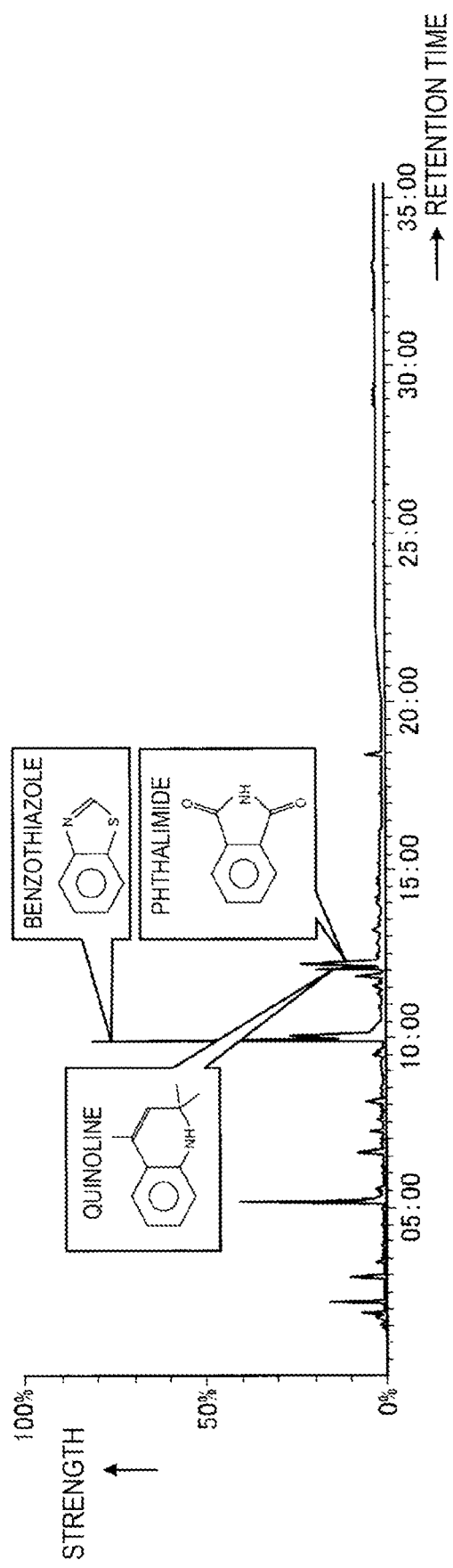
FIG. 27 is a diagram illustrating an example of a chromatogram obtained by gas chromatography.

FIGS. 24 to 27 illustrate examples of chromatograms obtained by gas chromatography. FIGS. 24 to 27 illustrate examples of substances volatilizing from residues of additives such as vulcanization accelerators, vulcanization retarders, anti-aging agents, and the like. FIG. 24 is a diagram illustrating an example of a chromatogram when a cap rubber of a tread portion of a tire is heated at 120° C. FIG. 25 is a diagram illustrating an example of a chromatogram when a cap rubber of a tread portion of a tire is heated at 165° C. FIG. 26 is a diagram illustrating an example of a chromatogram when the side rubber of the tire is heated at 120° C. FIG. 27 is a diagram illustrating an example of a chromatogram when the side rubber of the tire is heated at 165° C. In FIGS. 24 to 27, the horizontal axis is the retention time and the vertical axis is the strength.

Referring to FIG. 24, it can be seen that when the cap rubber was heated to 120° C., the residue of benzothiazole volatilized from the cap rubber. It is believed that benzothiazole has volatilized from the residue of N-tert-butyl-2-benzothiazolesulfenamide, which is a vulcanization accelerator. By detecting benzothiazole with a gas sensor, the possibility of abnormal heat build-up in the tire can be determined. In other words, for a tire in which the gas of the thiazole-based compound is volatilized due to an increase in the temperature, the gas may be detected using a gas sensor that detects at least the concentration of the gas of the thiazole-based compound.

Referring to FIG. 25, it can be seen that when the cap rubber was heated to 165° C., benzothiazole and quinoline volatilized from the cap rubber. It is believed that benzothiazole has volatilized from the residue of N-tert-butyl-2-benzothiazolesulfenamide, which is a vulcanization accelerator. It is believed that quinoline has volatilized from the residue of poly(2,2,4-trimethyl-1,2-dihydroquinoline), which is an anti-aging agent. By detecting at least one of benzothiazole and quinoline with a gas sensor, the possibility of abnormal heat build-up in the tire can be determined.

Referring to FIG. 26, it can be seen that when the side rubber was heated to 120° C., methyl isobutyl ketone and benzothiazole volatilized from the side rubber. It is believed that benzothiazole has volatilized from N-tert-butyl-2-benzothiazolesulfenamide, which is a vulcanization accelerator. By detecting at least one of methyl isobutyl ketone and benzothiazole with a gas sensor, the possibility of abnormal heat build-up in the tire can be determined.

Referring to FIG. 27, it can be seen that when the side rubber was heated to 165° C., benzothiazole, quinoline and phthalimide volatilized from the side rubber. It is believed that benzothiazole has volatilized from the residue of N-tert-butyl-2-benzothiazolesulfenamide, which is a vulcanization accelerator. It is believed that quinoline has volatilized from the residue of poly(2,2,4-trimethyl-1,2-dihydroquinoline), which is an anti-aging agent. It is believed that phthalimide has volatilized from the residue of N-(cyclohexylthio) phthalimide, which is a vulcanization retarder. By detecting at least one of benzothiazole, quinoline, and phthalimide with a gas sensor, the possibility of abnormal heat build-up in the tire can be determined.

From the foregoing, it is preferable that each of the gas sensors includes a gas sensor that detects at least the concentration of the thiazole-based compound. Accordingly, the volatilized residue of the vulcanization accelerator contained in the rubber can be detected. In particular, benzothiazole can be detected. In addition, a sensor that detects the concentration of the amine-based compound may be added. This improves the certainty that the source of the detected substance is the tire.

In addition, it is preferable that each of the gas sensors includes a gas sensor that detects at least the concentration of the thiazole-based compound, and a gas sensor that detects the concentration of another type of gas, and the tire of the vehicle is a tire in which different types of gases are volatilized due to an increase in the temperature. That is, for a tire in which a gas of a thiazole-based compound and a gas having a type other than the thiazole-based compound are volatilized due to an increase in the temperature, the gas may be detected using a gas sensor that detects the concentration of the gas of the thiazole-based compound and a gas sensor that detects a gas of a type other than the thiazole-based compound. Additionally, the determination accuracy can be improved by determining that there is a possibility of abnormal heat build-up in the tire when the gas is detected by both gas sensors. The combination with tires improves the accuracy of distinguishing from the abnormal increase in the temperature of the tire occurring in the tires of other vehicles. As the other types of gases, amine-based compounds, ketones, quinoline (derived from anti-aging agents), and phthalic acid derivatives (derived from residues of vulcanization retardants) are preferable. Furthermore, a substance that is not blended in a general tire is preferably blended in a tire. The gas derived from such a substance can be detected by preparing a gas sensor specialized for detecting the gas.

Furthermore, it is preferable that each of the gas sensors includes a gas sensor that corresponds to each of a plurality of types of gases and detects the concentration of each of the gases, and the tire of the vehicle contains a plurality of types of substances which volatilize due to an increase in the temperature and of which the boiling points are mutually different by a predetermined temperature or higher. The predetermined temperature is, for example, 10° C. Accordingly, the increase in the temperature of the tire can be detected in a stepwise manner by sequentially detecting gases derived from substances having boiling points mutually different by 10° C. or higher.

Modified Examples

The following modified examples can be considered for each of the above-described abnormality monitoring systems.

(1) A volatile substance may be encapsulated in microcapsules and mixed with the tire rubber. Since the melting point of microcapsules can be freely designed, the components volatilize when a discretionary temperature is reached. Thus, when microcapsules of which a specific component volatilizes when the temperature reaches a temperature corresponding to an abnormal temperature are mixed with the rubber of the tire and the component is detected by a gas sensor, the abnormal heat build-up in the tire can be detected in a stepwise manner. When the volatile substances corresponding to each temperature are encapsulated in separate microcapsules and mixed with the rubber of the tire, since the gas sensor detects the volatile substances in a stepwise manner, the heat build-up in the tire can be detected in a stepwise manner.

(2) A material containing a component that volatilizes as the temperature increases may be applied to at least a portion of the tire surface. It is preferable to apply the material to the groove bottom of the tread portion, the surface of the tire side portion, and the like so as not to disappear with wear. In this case, since the gas volatilizes from the tire surface, the detection sensitivity of the gas sensor is improved as compared with the case of mixing with rubber as in (1) described above.

(3) The gas sensor may be installed in the vicinity of the tire on the outer side of the tire, such as the tire housing, but may be installed in the cavity of each tire integrally with the air pressure sensor. In some vehicles, an air pressure sensor may be provided in the cavity of each tire, and when a gas sensor is provided integrally with the air pressure sensor, the power supply of the air pressure sensor and the power supply of the gas sensor can be shared.

(4) Another temperature sensor that measures the temperature of the braking device near the wheel and a gas sensor that is integrated with or near the temperature sensor may be provided, and the temperature abnormality of the tire may be determined using both the measurement result of the temperature of the braking device and the gas detection result. It is possible to distinguish between the case where the tire itself is generating abnormal heat and the case where the temperature of the tire increases due to the radiant heat or heat conduction of the abnormal heat generated by the vehicle body.

(5) A gas sensor may be provided in both the cavity and the vicinity of the outer side of each tire. By doing so, for a tire in which abnormal heat build-up occurs, the gas sensors in both the cavity and the vicinity of the outer side of the tire detect the same gas. In contrast, for other normal tires, both the gas sensors in the cavity and the outer side do not detect gas, or only the gas sensor near the outside detects gas. Thus, by providing the gas sensors in both the cavity and the vicinity of the outer side of each tire, the tire in which the abnormal heat build-up has occurred among the plurality of tires provided in the vehicle can be identified. For a double tire attached to the same wheel, a tire in which abnormal heat build-up has occurred can be identified.

(6) The warning signal output from the control unit 10 may be transmitted to an external device of the abnormality monitoring system, and the external device may output a warning to the driver of the vehicle 200 or an operation manager outside the vehicle. For example, a warning signal may be transmitted to a mobile communication network, and a control signal may be transmitted from a server device in the mobile communication network to a communication terminal (for example, a mobile phone or a smartphone) used by the driver and the operation manager of the vehicle 200. Accordingly, even when the warning unit 30 is not provided, a warning can be transmitted to the driver and the operation manager of the vehicle 200 by the mobile phone or the smartphone. In particular, when the vehicle 200 is a truck or a bus, it is preferable to transmit a signal to a communication terminal provided in an organization such as an operation management center via a mobile communication network.

(7) An electronic control unit (ECU) may be mounted on the vehicle 200 to construct a travel control system. In that case, the warning signal output from the control unit 10 may be input to the ECU of the vehicle 200 so that the warning is output to the driver, and the speed may be forcibly or automatically limited by the travel control system. For example, when traveling on a highway, the speed may be automatically suppressed by inputting the warning signal output from the control unit 10 to the ECU.

The invention claimed is:

1. An abnormality monitoring system, comprising:
a plurality of gas sensors provided in a cavity of a tire provided in a vehicle or in a vicinity of the tire;
a determination unit that determines a presence of an abnormality in the tire based on a detection result of the gas sensors; and
an output unit that outputs data based on a determination result of the determination unit,
the gas sensors detecting a volatile substance when abnormal heat build-up occurs in the tire, and the volatile substance being a substance derived from an additive added when the tire is manufactured, wherein
the gas sensors are provided at different positions of the vehicle, and
the determination unit determines the presence of the abnormality in the tire by comparing the detection result of the gas sensors.

2. The abnormality monitoring system according to claim 1, wherein
the determination unit makes a determination based on the detection result of the gas sensors.

3. The abnormality monitoring system according to claim 2, wherein
the vehicle comprises a plurality of the tires,
the plurality of the gas sensors are provided corresponding to the plurality of the tires, and
the determination unit determines the presence of the abnormality in the tire by comparing the detection result of the plurality of the gas sensors.

4. The abnormality monitoring system according to claim 2, wherein
the plurality of the gas sensors comprises a gas sensor provided at a position near the tire and a gas sensor provided at a position away from the vicinity of the tire.

5. The abnormality monitoring system according to claim 1, wherein
the tire of the vehicle volatilizes a gas of a thiazole-based compound as the temperature increases, and
at least one of the gas sensors detects at least a concentration of the gas of the thiazole-based compound.

6. The abnormality monitoring system according to claim 5, wherein
the tire of the vehicle volatilizes a gas having a type other than the thiazole-based compound as the temperature increases, and
the abnormality monitoring system further comprising another gas sensor that detects a concentration of the gas having the type other than the thiazole-based compound.

7. The abnormality monitoring system according to claim 1, wherein
the gas sensors comprise a gas sensor that corresponds to a plurality of types of gases and detects a concentration of each gas, and
the tire of the vehicle contains a plurality of types of substances which volatilize as the temperature increases and which have mutually different boiling points which differ by a predetermined temperature or higher.

8. The abnormality monitoring system according to claim 7, further comprising:
a temperature sensor that detects a temperature of an outer surface of the tire or the cavity of the tire, wherein
the determination unit determines the presence of the abnormality in the tire based on the detection result of the gas sensors and a detection result of the temperature sensor.

9. The abnormality monitoring system according to claim 1, wherein, the determination unit determines that there is a possibility of abnormal heat build-up in the tire of the vehicle when, after gas is detected by the gas sensors, a same gas is detected by the gas sensors after a predetermined time has elapsed.

10. The abnormality monitoring system according to claim 1, wherein the determination unit determines the presence of the abnormality in the tire by comparing the detection result of the gas sensors with a predetermined threshold value.

11. The abnormality monitoring system according to claim 9, further comprising:
a speed sensor that detects a travel speed of the vehicle, wherein
the determination unit has a plurality of types of predetermined threshold values that are selectable, and
the determination unit makes the determination using a threshold value selected based on a detection result of the speed sensor among the plurality of types of predetermined threshold values.

12. The abnormality monitoring system according to claim 1, further comprising:
at least one of an air pressure sensor that detects an air pressure of the cavity of the tire or a temperature sensor that detects a temperature of an outer surface of the tire or the cavity of the tire, wherein the determination unit determines the presence of the abnormality in the tire based on a detection result of at least one of the air pressure sensor or the temperature sensor and the detection result of the gas sensors.

13. The abnormality monitoring system according to claim 1, further comprising:
a temperature sensor that detects a temperature of a braking device provided in a vicinity of a wheel of the vehicle, wherein
the gas sensors are provided in a vicinity of the temperature sensor, and
the presence of the abnormality in the tire is determined based on a detection result of the temperature sensor and the detection result of the gas sensors.

14. An abnormality monitoring system, comprising:
a plurality of gas sensors provided in a cavity of a tire provided in a vehicle or in a vicinity of the tire;
a determination unit that determines a presence of an abnormality in the tire based on a detection result of the plurality of the gas sensors; and
an output unit that outputs data based on a determination result of the determination unit, wherein
the vehicle comprises a plurality of the tires,
the plurality of the gas sensors are provided corresponding to the plurality of the tires,
the plurality of the gas sensors detecting a volatile substance when abnormal heat build-up occurs in the tire, and the volatile substance being a substance derived from an additive added when the tire is manufactured,
the determination unit makes a determination based on the detection result of the plurality of the gas sensors, and
the determination unit determines the presence of the abnormality in the tire by comparing the detection result of the plurality of the gas sensors.

15. An abnormality monitoring system, comprising:
a plurality of gas sensors provided in a cavity of a tire provided in a vehicle or in a vicinity of the tire;
a determination unit that determines a presence of an abnormality in the tire based on a detection result of the plurality of the gas sensors; and
an output unit that outputs data based on a determination result of the determination unit, wherein
the plurality of the gas sensors comprises a gas sensor provided at a position near the tire and a gas sensor provided at a position away from the vicinity of the tire,
the plurality of the gas sensors detecting a volatile substance when abnormal heat build-up occurs in the tire, and the volatile substance being a substance derived from an additive added when the tire is manufactured,
the determination unit makes a determination based on the detection result of the plurality of the gas sensors, and
the determination unit determines the presence of the abnormality in the tire by comparing the detection result of the plurality of the gas sensors.

16. An abnormality monitoring system, comprising:
a gas sensor provided in a cavity of a tire provided in a vehicle or in a vicinity of the tire;
a determination unit that determines a presence of an abnormality in the tire based on a detection result of the gas sensor; and
an output unit that outputs data based on a determination result of the determination unit,
the gas sensor detecting a volatile substance when abnormal heat build-up occurs in the tire, and the volatile substance being a substance derived from an additive added when the tire is manufactured, wherein
the gas sensor corresponds to a plurality of types of gases and detects a concentration of each of the gases, and
the tire of the vehicle contains a plurality of types of substances which volatilize as the temperature increases and which have mutually different boiling points which differ by a predetermined temperature or higher.

17. An abnormality monitoring system, comprising:
a gas sensor provided in a cavity of a tire provided in a vehicle or in a vicinity of the tire;
a determination unit that determines a presence of an abnormality in the tire based on a detection result of the gas sensor;
an output unit that outputs data based on a determination result of the determination unit; and
a temperature sensor that detects a temperature of an outer surface of the tire or the cavity of the tire;
the gas sensor detecting a volatile substance when abnormal heat build-up occurs in the tire, and the volatile substance being a substance derived from an additive added when the tire is manufactured, wherein
the gas sensor corresponds to a plurality of types of gases and detects a concentration of each of the gases,
the tire of the vehicle contains a plurality of types of substances which volatilize as the temperature increases and which have mutually different boiling points which differ by a predetermined temperature or higher, and
the determination unit determines the presence of the abnormality in the tire based on the detection result of the gas sensor and a detection result of the temperature sensor.

18. An abnormality monitoring system, comprising:
a gas sensor provided in a cavity of a tire provided in a vehicle or in a vicinity of the tire;
a determination unit that determines a presence of an abnormality in the tire based on a detection result of the gas sensor;
an output unit that outputs data based on a determination result of the determination unit; and
a speed sensor that detects a travel speed of the vehicle;
the gas sensor detecting a volatile substance when abnormal heat build-up occurs in the tire, and the volatile substance being a substance derived from an additive added when the tire is manufactured, wherein
the determination unit has a plurality of types of predetermined threshold values that are selectable, and
the determination unit makes the determination using a threshold value selected based on a detection result of the speed sensor among the plurality of types of predetermined threshold values.

19. An abnormality monitoring system, comprising:
a gas sensor provided in a cavity of a tire provided in a vehicle or in a vicinity of the tire;
a determination unit that determines a presence of an abnormality in the tire based on a detection result of the gas sensor;
an output unit that outputs data based on a determination result of the determination unit; and
a temperature sensor that detects a temperature of a braking device provided in a vicinity of a wheel of the vehicle;
the gas sensor detecting a volatile substance when abnormal heat build-up occurs in the tire, and the volatile substance being a substance derived from an additive added when the tire is manufactured, wherein the gas sensor is provided in a vicinity of the temperature sensor, and the presence of the abnormality in the tire is determined based on a detection result of the temperature sensor and the detection result of the gas sensor.

* * * * *